United States Patent
Tanii

(10) Patent No.: US 11,640,709 B2
(45) Date of Patent: May 2, 2023

(54) MERCHANDISE SPECIFICATION SYSTEMS AND PROGRAMS

(71) Applicant: Marketvision Co., Ltd., Tokyo (JP)

(72) Inventor: Akiyoshi Tanii, Tokyo (JP)

(73) Assignee: MARKETVISION CO., LTD., Tokyo (JP)

( * ) Notice: Subject to any disclaimer, the term of this patent is extended or adjusted under 35 U.S.C. 154(b) by 229 days.

(21) Appl. No.: 16/624,114

(22) PCT Filed: Jun. 8, 2018

(86) PCT No.: PCT/JP2018/021981
§ 371 (c)(1),
(2) Date: Dec. 18, 2019

(87) PCT Pub. No.: WO2019/003858
PCT Pub. Date: Jan. 3, 2019

(65) Prior Publication Data
US 2020/0134688 A1    Apr. 30, 2020

(30) Foreign Application Priority Data
Jun. 27, 2017 (JP) .............................. JP2017-124742

(51) Int. Cl.
*G06Q 30/06*     (2012.01)
*G06V 20/20*     (2022.01)
*G06Q 30/0601*   (2023.01)

(52) U.S. Cl.
CPC ..... *G06Q 30/0625* (2013.01); *G06Q 30/0639* (2013.01); *G06V 20/20* (2022.01)

(58) Field of Classification Search
CPC . G06Q 30/0601–0645; G06Q 30/0625; G06Q 30/0639; G06Q 30/02; G06Q 30/06;
(Continued)

(56) References Cited

U.S. PATENT DOCUMENTS

| | | | |
|---|---|---|---|
| 2009/0059270 A1* | 3/2009 | Opalach | G06Q 10/087 358/1.15 |
| 2011/0011936 A1* | 1/2011 | Morandi | G06Q 20/203 235/454 |

(Continued)

FOREIGN PATENT DOCUMENTS

| | | |
|---|---|---|
| JP | H05-334409 A | 12/1993 |
| JP | H05-342230 A | 12/1993 |

(Continued)

OTHER PUBLICATIONS

Pixelworks adds increased flexibility for digital projector designs with next-generation opal ImageProcessor IC and new 'cranberry' keystone correction IC. (Jan. 8, 2007). Business Wire Retrieved from https://dialog.proquest.com/professional/docview/1071360422?accountid=131444 (Year: 2007).*

(Continued)

*Primary Examiner* — Marissa Thein
*Assistant Examiner* — Ashley D Preston
(74) *Attorney, Agent, or Firm* — Lucas & Mercanti, LLP

(57) ABSTRACT

A merchandise specification system has: a keystone correction processing unit that performs a keystone correction process on photographed image information obtained by photographing the display shelf to generate front-facing image information; and a merchandise identification information specification processing unit that specifies merchandise on a face in the front-facing image information.

10 Claims, 20 Drawing Sheets

(58) Field of Classification Search
CPC ...... G06V 20/20; G06V 10/24; G06V 10/462; G06V 10/751; A47F 5/00; G06T 5/00
USPC .............................................. 705/26.1–27.2
See application file for complete search history.

(56) References Cited

U.S. PATENT DOCUMENTS

| | | | |
|---|---|---|---|
| 2011/0069284 A1* | 3/2011 | Furui | G03B 5/00 353/121 |
| 2015/0049080 A1* | 2/2015 | Purayil | G06F 3/048 345/419 |
| 2016/0335590 A1 | 11/2016 | Hassan et al. | |
| 2017/0178227 A1 | 6/2017 | Graham et al. | |
| 2018/0005035 A1* | 1/2018 | Bogolea | B25J 19/023 |

FOREIGN PATENT DOCUMENTS

| | | |
|---|---|---|
| JP | 2007-266694 A | 10/2007 |
| JP | 2007266694 A | 10/2007 |
| JP | 2010-218232 A | 9/2010 |
| JP | 2011-198131 A | 10/2011 |
| JP | 2014-178739 A | 9/2014 |
| JP | 2016-071782 A | 5/2016 |
| JP | 2016071782 A | 5/2016 |
| WO | 2012029548 A1 | 3/2012 |

OTHER PUBLICATIONS

JPO, Office Action for the related Japanese patent application No. 2020-068783, dated Jun. 9, 2021, with English translation.
EPO, Extended European Search Report for the corresponding European patent application No. 2018-145794, dated Mar. 19, 2021.
Saran Anurag, et al.: "Robust visual analysis for planogram compliance problem," 14th IAPR International Conference on Machine Vision Applications, IEEE, May 18, 2015, pp. 576-579.
JPO, Office Action for the corresponding Japanese patent application No. 2018-145794, dated Aug. 22, 2019, with English translation.
International Search Report dated Jul. 10, 2018 for PCT/JP2018/021981 and English translation.

* cited by examiner

MERCHANDISE SPECIFICATION SYSTEMS AND PROGRAMS

CROSS REFERENCE TO RELATED APPLICATION

This Application is a 371 of PCT/JP2018/021981 filed on Jun. 8, 2018 which, in turn, claimed the priority of Japanese Patent Application No. 2017-124742 filed on Jun. 27, 2017, both applications are incorporated herein by reference.

TECHNICAL FIELD

The present invention relates to a merchandise specification system for specifying merchandise displayed at a store or the like.

BACKGROUND ART

In the retail industry, it is known that the display status of merchandise affects the sales of merchandise. Therefore, merchandise manufacturers and sales companies need to grasp information on where in stores their merchandise is displayed and make development strategies and sales strategies of their merchandise based on the information.

For this end, it is important to accurately specify the merchandise displayed at the store. Therefore, the in-store display shelves may be photographed so that humans manually specify the displayed merchandise from image information of the photographs. In this case, the merchandise can be specified almost accurately. However, in order to keep track of the display status of merchandise, it is necessary to monitor the display status at regular intervals. However, it is burdensome and inefficient that humans specify merchandise from image information of photographs of the in-store display shelves every time.

It is thus required to automatically specify the displayed merchandise from the image information obtained by photographing the in-store display shelves and determine the display status of the merchandise. For example, there are methods by which to use image recognition techniques for images obtained by photographing in-store display shelves based on a sample image for each piece of merchandise. As examples of these conventional techniques, there are systems that manage the display status of merchandise by using the techniques shown in Patent Literatures 1 to 3 listed below.

CITATION LIST

Patent Literatures

Patent Literature 1: JP 5-342230 A
Patent Literature 2: JP 5-334409 A
Patent Literature 3: WO 2012/029548 A

SUMMARY OF INVENTION

Technical Problem

The invention described in Patent Literature 1 is a system that supports persons who has no knowledge on which display shelves to display merchandise. Therefore, it is not possible to determine the actual display status of merchandise. Patent Literature 2 describes a system that supports the input of merchandise images in a shelf allocation support system that supports the display of merchandise. However, the system described in Patent Literature 2 only supports the input of merchandise images when using the shelf allocation support system, and it is not possible to specify the actual display status with the use of this system.

Patent Literature 3 describes an invention of, when there is vacant space on in-store display shelves, notifying the specified merchandise to be displayed in the vacant space or the merchandise wrongly displayed on in-store display shelves. In this invention as well, an image matching process is performed between the merchandise and the merchandise displayed on in-store display shelves to specify the merchandise displayed on in-store display shelves. However, the recognition accuracy is low in actuality.

When using an image recognition technique based on sample images for photograph images of display shelves, the accuracy and processing load of image recognition becomes a problem. For example, in a store where display shelves are installed, if the lighting state is not uniform and is greatly different from the lighting state of the sample images, the accuracy of image recognition decreases. For this reason, it may not be easy to specify the merchandise displayed on display shelves from the photographed images. In addition, a great amount of resources are required for image recognition that generates a large processing load. Therefore, the invested capital becomes large.

Solution to Problem

In view of the above problems, the present inventors have invented a merchandise specification system that can specify merchandise on display shelves with higher accuracy than before and can reduce the processing load.

A first invention is a merchandise specification system for specifying merchandise displayed on a display shelf. The merchandise specification system has: a keystone correction processing unit that performs a keystone correction process on photographed image information obtained by photographing the display shelf to generate front-facing image information; and a merchandise identification information specification processing unit that specifies merchandise on a face in the front-facing image information. The keystone correction processing unit projects vertexes used in the keystone correction process on first photographed image information onto second photographed image information, based on correspondence between the first photographed image information and the second photographed image information, and executes the keystone correction process on the second photographed image information based on the projected vertexes to generate front-facing image information. The merchandise identification information specification processing unit compares the image information of a face in second front-facing image information with the image information of a face within a predetermined range of first front-facing image information corresponding to the face to specify merchandise identification information of merchandise on the face in the second front-facing image information.

Using the merchandise specification system of the present invention makes it possible to specify the merchandise on the display shelf with higher accuracy than before. In addition, the processing load at that time can be reduced. Specifically, photographed image information often does not become image information obtained by photographing from the front, so it is necessary to perform the keystone correction process to correct the image to face the front. This is because it is preferable to perform the image matching process between the image information obtained from the images facing the front. Therefore, the person in charge has to specify the vertexes that are references for the keystone correction process, which is a heavy burden. Using the present invention makes it possible to automatically specify vertexes that serves as references for the keystone correction process, and to reduce the work load on the person in charge.

In addition, in order to specify the merchandise in the face of the front-facing image information, it has been conventionally general to compare with the sample image information of the merchandise. However, if the image matching process is performed with the sample image information of the merchandise, the processing load will increase and the accuracy will not be high. On the other hand, in the present invention, comparing with the image information of the face in the first front-facing image information makes it possible to significantly decrease the image matching process with a smaller processing load. In addition, since the arrangement of merchandise is often continuous, if the degree of similarity with the image information of the face in the first front-facing image information is high, there is a high possibility that the same merchandise is arranged. Therefore, it is possible to improve the accuracy of specifying the merchandise.

In the above-described invention, the merchandise specification system can be configured such that the keystone correction processing unit projects the vertexes used in the keystone correction process on the first photographed image information onto the second photographed image information using similarity between an image feature amount in the first photographed image information and an image feature amount in the second photographed image information, and executes the keystone correction process on the second photographed image information based on the projected vertexes to generate the front-facing image information.

In the above-described invention, the merchandise specification system can be configured such that the keystone correction processing unit compares an image feature amount in a feature amount collection region that is set in the first photographed image information and includes the vertexes used in the keystone correction process on the first photographed image information with an image feature amount in a feature amount collection region that is set in the second photographed image information and is larger than the feature amount collection region in the first photographed image information to specify a pair of image feature amounts with a high degree of similarity, specifies a function of projection from the first photographed image information onto the second photographed image information based on coordinates of the specified pair of image feature amounts, projects the vertexes used in the keystone correction process on the first photographed image information onto the second photographed image information using the specified function, and executes the keystone correction process on the second photographed image information using the projected vertexes.

The process in the keystone correction processing unit can also be executed as in the present invention.

In the above-described invention, the merchandise specification system further includes a sample image information storage unit that stores sample image information of the merchandise, and the merchandise specification system can be configured such that the merchandise identification information specification processing unit further compares image information of a face in the second front-facing image information with image information of a face in a predetermined range in the first front-facing image information corresponding to the face, and when similarity does not satisfy a predetermined condition, compares the image information of the face in the second front-facing image information with the sample image information stored in the sample image information storage unit to specify the merchandise identification information of the merchandise in the face in the second front-facing image information.

The arrangement of the merchandise on the display shelf may be changed. In that case, when specifying the merchandise identification information of the face in the second front-facing image information, it may be found as a result of comparison with the face image information of the face in the first front-facing image information that the similarity does not satisfy the predetermined condition. In this case, as in the present invention, it is preferable to specify the merchandise identification information by comparing the image information of the face in the second front-facing image information and the sample image information.

In the above-described invention, the merchandise specification system further includes a face specification processing unit that specifies the face in the front-facing image information, and the merchandise specification system can be configured such that the face specification processing unit specifies a position of the face in the second front-facing image information based on a position of the face in the first front-facing image information.

The position of the face in the second front-facing image information can be specified without applying a processing load by specifying based on the position of the face in the first front-facing image information.

In the above-described invention, the merchandise specification system further includes a shelf tier position specification processing unit that specifies a position of a shelf tier in the front-facing image information, and the merchandise specification system can be configured such that the shelf tier position specification processing unit specifies the position of the shelf tier in the second front-facing image information based on the position of the shelf tier in the first front-facing image information.

The position of the shelf tier in the second front-facing image information can be specified without applying a processing load by specifying based on the position of the shelf tier in the first front-facing image information as in the present invention.

In the above-described invention, the merchandise specification system can be further configured to compare image information of a shelf tier in the second front-facing image information with image information of a shelf tier in the first front-facing image information, and when similarity satisfies a predetermined condition, the merchandise identification information specification processing unit specifies merchandise identification information of a face on the shelf tier in the second front-facing image information as merchandise identification information of a face on the shelf tier in the first front-facing image information, without comparing the image information of the face in the second front-facing image information with the image information of the face in the predetermined range of the first front-facing image information.

Some of shelf tiers do not have much change of merchandise, and conversely, others are managed in a very short cycle. When these shelf tiers are photographed at regular intervals, photographed image information of the shelves does not change so much. Therefore, if the degree of similarity between the image information of the shelf tier in the second front-facing image information and the image information of the shelf tier in the first front-facing image information is high, it is considered that the same merchandise is placed there. Therefore, the configuration of the present invention makes it possible to collectively specify the merchandise identification information of the faces on each shelf tier in the second front-facing image information without individually processing each of the faces. Accordingly, the merchandise identification information can be specified without applying a processing load.

The keystone correction process of the first invention can also be implemented according to the configuration of the present invention. That is, the present invention is a merchandise specification system for specifying merchandise on a display shelf. The merchandise specification system has a keystone correction processing unit that performs a keystone correction process on image information obtained by photographing the display shelf to generate front-facing image information. The keystone correction processing unit projects vertexes used in the keystone correction process on first photographed image information onto second photographed image information, based on correspondence between the first photographed image information and the second photographed image information, and executes the keystone correction process on the second photographed image information based on the projected vertexes to generate front-facing image information.

The photographed image information often does not become image information obtained by photographing from the front, so it is necessary to perform the keystone correction process to correct the image to face the front. This is because it is preferable to perform the image matching process between the image information obtained from the images facing the front. Therefore, the person in charge has to specify the vertexes that are references for the keystone correction process, which is a heavy burden. Using the present invention makes it possible to automatically specify vertexes that serves as references for the keystone correction process, and to reduce the work load on the person in charge.

The merchandise specifying process of the first invention can also be implemented according to the configured of the present invention. That is, the present invention is a merchandise specification system for specifying merchandise on a display shelf. The merchandise specification system has a merchandise identification information specification processing unit that specifies merchandise on a face in image information obtained by photographing the display shelf. The merchandise identification information specification processing unit compares image information of a face in second front-facing image information with image information of a corresponding face within a predetermined range of first front-facing image information to specify merchandise identification information of merchandise on the face in the second front-facing image information.

In order to specify the merchandise in the face of the front-facing image information, it has been conventionally general to compare with the sample image information of the merchandise. However, if the image matching process is performed with the sample image information of the merchandise, the processing load will increase and the accuracy will not be high. On the other hand, in the present invention, comparing with the image information of the face in the first front-facing image information makes it possible to significantly decrease the image matching process with a smaller processing load. In addition, since the arrangement of merchandise is often continuous, if the degree of similarity with the image information of the face in the first front-facing image information is high, there is a high possibility that the same merchandise is arranged. Therefore, it is possible to improve the accuracy of specifying the merchandise.

It is preferred to use the image processing system of the present invention in order to specify vertexes for performing a keystone correction process of facing photographed image information to the front. That is, the present invention is an image processing system that specifies vertexes for performing a keystone correction process on photographed image information. The image processing system has a keystone correction processing unit that performs the keystone correction process on photographed image information obtained by photographing a target object to generate front-facing image information. The keystone correction processing unit projects vertexes used in the keystone correction process on first photographed image information onto second photographed image information, based on correspondence between the first photographed image information and the second photographed image information, and executes the keystone correction process on the second photographed image information based on the projected vertexes to generate front-facing image information.

The photographed image information often does not become image information obtained by photographing from the front, so it is necessary to perform the keystone correction process to correct the image to face the front. In that case, the person in charge has to specify the vertexes that are references for the keystone correction process, which is a heavy burden. Therefore, using the present invention makes it possible to automatically specify vertexes that serves as references for the keystone correction process, and to reduce the work load on the person in charge.

In the above-described invention, the image processing system can be configured such that the keystone correction processing unit projects the vertexes used in the keystone correction process on the first photographed image information onto the second photographed image information using similarity between an image feature amount in the first photographed image information and an image feature amount in the second photographed image information, and executes the keystone correction process on the second photographed image information based on the projected vertexes to generate the front-facing image information.

In the above-described invention, the image processing system can be configured such that the keystone correction processing unit compares an image feature amount in a feature amount collection region that is set in the first photographed image information and includes the vertexes used in the keystone correction process on the first photographed image information with an image feature amount in a feature amount collection region that is set in the second photographed image information and is larger than the feature amount collection region in the first photographed image information to specify a pair of image feature amounts with a high degree of similarity, specifies a function of projection from the first photographed image information onto the second photographed image information based on coordinates of the specified pair of image feature amounts, projects the vertexes used in the keystone correction process on the first photographed image information onto the second photographed image information using the specified function, and executes the keystone correction process on the second photographed image information using the projected vertexes.

The process in the keystone correction processing unit can also be executed as in the present invention.

The merchandise specification system of the first invention can be implemented by reading and executing a program of the present invention on a computer. That is, the present invention is a product specification program for causing a computer to serve as a keystone correction processing unit that performs a keystone correction process on photographed image information obtained by photographing a display shelf to generate front-facing image information and a merchandise identification information specification processing unit that specifies merchandise on a face in the front-facing image information. The keystone correction processing unit projects vertexes used in the keystone correction process on first photographed image information onto second photographed image information, based on correspondence between the first photographed image information and the second photographed image information obtained by photographing the same display shelf as in the first photographed image information, and executes the keystone correction process on the second photographed image information based on the projected vertexes to generate front-facing image information. The merchandise identification information specification processing unit compares the image information of a face in the second front-facing image information with the image information of a face within a predetermined range of the first front-facing image information corresponding to the face to specify merchandise identification information of merchandise on a face in the second front-facing image information.

The merchandise specification system of the eighth invention can be implemented by reading and executing a program of the present invention on a computer. That is, the present invention is a merchandise specification program for causing a computer to serve as a keystone correction processing unit that performs a keystone correction process on image information obtained by photographing a display shelf to generate front-facing image information. The keystone correction processing unit projects vertexes used in the keystone correction process on first photographed image information onto second photographed image information, based on correspondence between the first photographed image information and the second photographed image information obtained by photographing the same display shelf as in the first photographed image information, and executes the keystone correction process on the second photographed image information based on the projected vertexes to generate front-facing image information.

The merchandise specification system of the ninth invention can be implemented by reading and executing a program of the present invention on a computer. That is, the present invention is a merchandise specification program for causing a computer to serve as a merchandise identification information specification processing unit that specifies merchandise on a face in image information obtained by photographing a display shelf. The merchandise identification information specification processing unit compares the image information of a face in the second front-facing image information with the image information of a face within a predetermined range of the first front-facing image information corresponding to the face to specify merchandise identification information of merchandise on a face in the second front-facing image information.

The image processing system of the tenth invention can be implemented by reading and executing a program of the present invention on a computer. That is, the present invention is an image processing program for causing a computer to serve as a keystone correction processing unit that performs a keystone correction process on photographed image information obtained by photographing a target to generate front-facing image information. The keystone correction processing unit projects vertexes used in the keystone correction process on first photographed image information onto second photographed image information, based on correspondence between the first photographed image information and the second photographed image information obtained by photographing the same target object as in the first photographed image information, and executes the keystone correction process on the second photographed image information based on the projected vertexes to generate front-facing image information.

Advantageous Effects of Invention

Using the merchandise specification system of the present invention makes it possible to specify merchandise on display shelves with higher accuracy than before and reduce the processing load.

DESCRIPTION OF EMBODIMENTS

Figure 1:
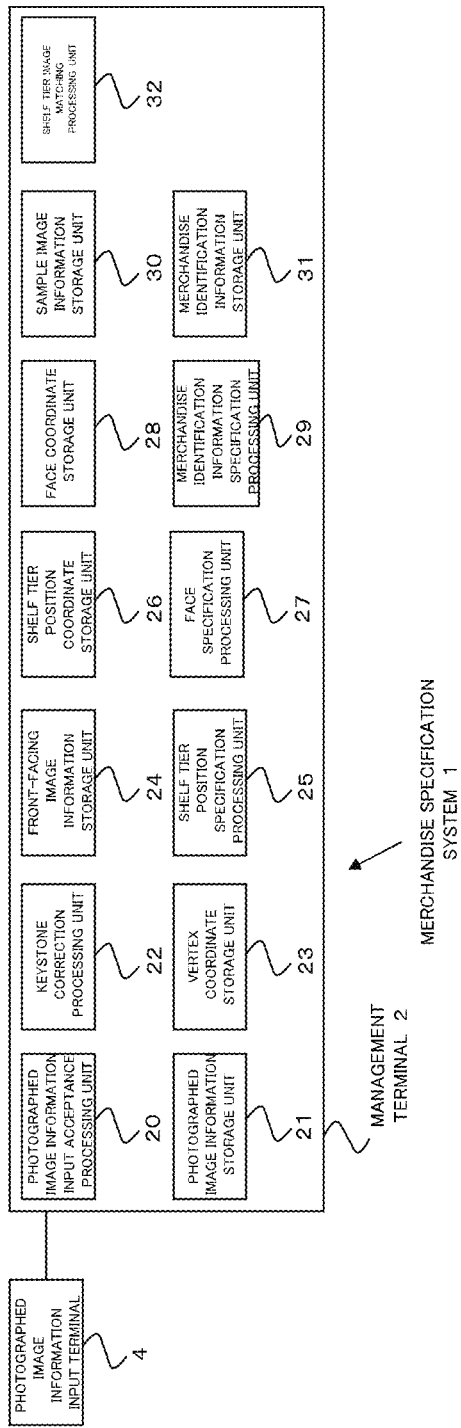
FIG. 1 is a block diagram schematically showing an example of a system configuration of a merchandise specification system of the present invention.

FIG. 1 shows an example of a system configuration of a merchandise specification system 1 of the present invention. The merchandise specification system 1 uses a management terminal 2 and a photographed image information input terminal 3.

The management terminal 2 is a computer used by an organization such as a company that operates the merchandise specification system 1. The photographed image information input terminal 3 inputs photographed image information obtained by photographing in-store display shelves to the management terminal 2.

Figure 2:
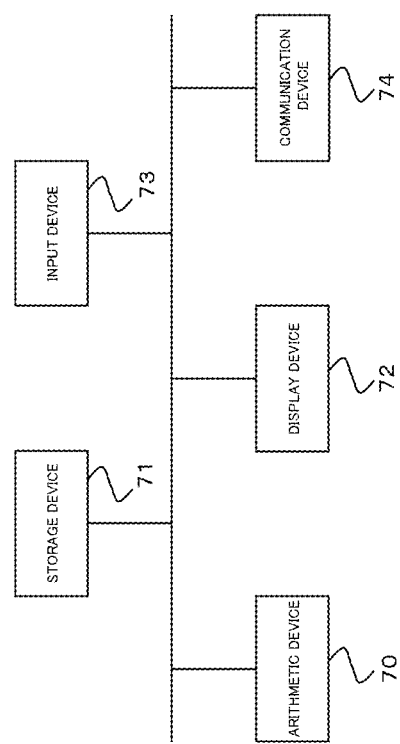
FIG. 2 is a block diagram schematically showing an example of a hardware configuration of a computer used in the merchandise specification system of the present invention.

The management terminal 2 and the photographed image information input terminal 3 in the merchandise specification system 1 are implemented using a computer. FIG. 2 schematically shows an example of a hardware configuration of the computer. The computer has: an arithmetic device 70 such as a CPU that executes arithmetic operations in programs; a storage device 71 such as a RAM and hard disk that stores information; a display device 72 such as a display that displays information; an input device 73 such as a keyboard and a mouse that is capable of inputting information; and a communication device 74 that transmits or receives the results of processing by the arithmetic device 70 and the information stored in the storage device 71 via the internet or a network such as a LAN.

When the computer includes a touch panel display, the display device 72 and the input device 73 may be integrated. The touch panel display is often used in, for example, a portable communication terminal such as a tablet computer or a smartphone, but is not limited thereto.

The touch panel display is a device in which the functions of the display device 72 and the input device 73 are integrated, in that inputs can be performed directly on the display or by using a predetermined input device (such as a touch panel pen) or a finger.

The photographed image information input terminal 3 may include a photographing device such as a camera in addition to the above devices. As the photographed image information input terminal 3, a portable communication terminal such as a mobile phone, a smartphone, or a tablet computer can be used.

The units in the present invention are only logically distinguished in function, and may constitute the same region physically or practically.

The management terminal 2 in the merchandise specification system 1 can transmit and receive information to and from the photographed image information input terminal 3 via a network.

The management terminal 2 in the merchandise specification system 1 has: a photographed image information input acceptance processing unit 20; a photographed image information storage unit 21, a keystone correction processing unit 22, a vertex coordinate storage unit 23, an front-facing image information storage unit 24, a shelf tier position specification processing unit 25; a shelf tier position coordinate storage unit 26; a face specification processing unit 27, a face coordinate storage unit 28; a merchandise identification information specification processing unit 29; a sample image information storage unit 30; a merchandise identification information storage unit 31; and a shelf tier image matching processing unit 32.

The photographed image information input acceptance processing unit 20 accepts an input of image information of a store display shelf photographed by the photographed image information input terminal 3 (photographed image information), and stores the same in the photographed image information storage unit 21 described later. From the photographed image information input terminal 3, the photographed image information input acceptance processing unit 20 preferably accepts, in addition to the photographed image information, photographing date and time, store identification information such as a store name, and image information identification information for specifying image information.

The photographed image information storage unit 21 stores the photographed image information, photographing date and time, store identification information, image information identification information accepted by the photographed image information input acceptance processing unit 20 in association with one another. The photographed image information is any image information that is subject to a keystone correction process. When one display shelf is photographed in a plurality of images, the photographed image information also includes image information obtained by combining the plurality of images. Further, the photographed image information includes image information having undergone a distortion correction process.

The keystone correction processing unit 22 performs a keystone correction process on the photographed image information stored in the photographed image information storage unit 21 to generate front-facing image information. The keystone correction processing unit 22 stores the front-facing image information in the front-facing image information storage unit 24. At this time, the keystone correction processing unit 22 preferably stores the front-facing image information in association with the photographing date and time, store identification information, image information identification information for the photographed image information, image information identification information for the front-facing image information, and the like. The keystone correction process is a correction process that is performed so that the shelf tiers of the display shelf seen in the photographed image information look horizontal and the merchandise displayed on the shelf tiers looks vertical.

The keystone correction process by the keystone correction processing unit 22 is divided into a first keystone correction process and a second and subsequent keystone correction processes.

In the first keystone correction process by the keystone correction processing unit 22, an input of designation of four vertexes of rectangular region of the display shelf is accepted. The four vertexes of rectangular region of the display shelf may be the four vertexes of a shelf position of the display shelf or the four vertexes of a shelf tier. Further, the four vertexes may be four vertexes of a group of two or three shelf tiers. The keystone correction processing unit 22 stores the four vertexes of which designation has been accepted in the vertex coordinate storage unit 23 in association with the photographing date and time information, the store information, and the image information identification information for the photographed image information. Then, the keystone correction processing unit 22 performs a keystone correction process on the photographed image information based on the coordinates of the four vertexes of which designation has been accepted, and stores the processed photographed image information as the front-facing image information in the front-facing image information storage unit 24. At this time, the keystone correction processing unit 22 stores the front-facing image information in the front-facing image information storage unit 24 in association with the photographing date and time information, the store information, the image information identification information for the photographed image information, and the image identification information for the front-facing image information. A publicly known method can be used for the front-facing process based on the coordinate information of the four vertexes of which designation has been accepted.

The photographed image information is desirably obtained by photographing similar regions at similar angles for every fixed period. However, it is not possible to photograph completely the same region at the same angle. Therefore, the keystone correction processing unit 22 performs the second and subsequent keystone correction processes as described below.

Figure 5:
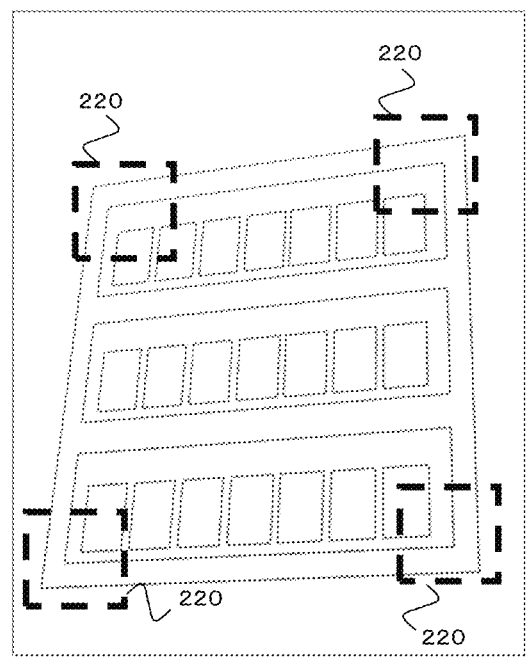
FIG. 5 is a diagram showing an example of a state in which feature amount collection regions are set to N–1th photographed image information.

First, the keystone correction processing unit 22 specifies the vertex coordinates of the N−1th photographed image information obtained by photographing the same (substantially the same) region corresponding to the Nth photographed image information from the vertex coordinate storage unit 23. The keystone correction processing unit 22 specifies the vertex coordinates of the N−1th photographed image information obtained by photographing the same (substantially the same) region corresponding to the Nth photographed image information, based on the store identification information, the image identification information, and the photographing date and time information corresponding to the photographed image information. Then, the keystone correction processing unit 22 sets rectangular regions of a predetermined size including the coordinates of the four designated vertexes, for example, squares about ⅕ of the width of the shelf tier, as feature amount collection regions 220, to the N−1th photographed image information. FIG. 5 shows an example of a state in which the feature amount collection regions 220 are set to the N−1th photographed image information. The feature amount collection regions 220 can be any rectangular regions including the vertex coordinates. On the other hand, if the backgrounds of the display shelf match each other, the backgrounds will be greatly displaced by a slight shift in the photographing position. Therefore, it is preferable to set the feature amount collection regions 220 at positions including as much inside of the display shelf as possible. That is, the vertex coordinates in the feature amount collection region 220 are preferably located in the outer side of the display shelf than the center point of the feature amount collection region 220. For example, the four vertex coordinates are located at the upper left, upper right, lower left, and lower right. When the rectangular feature amount collection region 220 is divided into two each at the vertical and horizontal centers, total four regions, the feature amount collection region 220 is set such that the feature amount collection region 220 including the upper left vertex coordinates has the vertex coordinates located at the upper left of the rectangular region. Similarly, the feature amount collection region 220 is set such that the feature amount collection region 220 including the upper right vertex coordinates has the vertex coordinates located at the upper right of the rectangular region, the feature amount collection region 220 is set such that the feature amount collection region 220 including the lower left vertex coordinates has the vertex coordinates located at the lower left of the rectangular region, and the feature amount collection region 220 is set such that the feature amount collection region 220 including the lower right vertex coordinates has the vertex coordinates located at the lower right of the rectangular region. As a result, the vertex coordinates in the feature amount collection region 220 are located in the outer side of the display shelf than the center point of the feature amount collection region 220.

Figure 6:
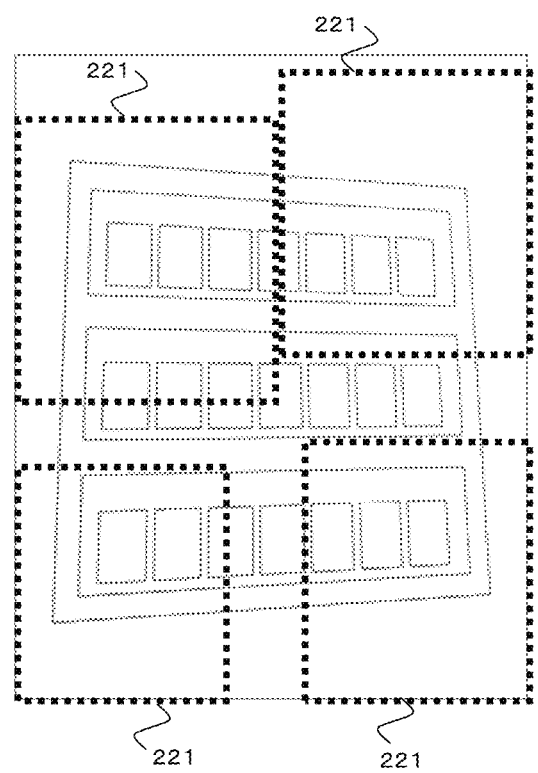
FIG. 6 is a diagram showing an example of a state in which feature amount collection regions are set to Nth photographed image information.

Next, the keystone correction processing unit 22 sets feature amount collection regions 221 that include the feature amount collection regions 220 set to the N−1th photographed image information and are larger in size than the feature amount collection regions 220 in the N−1th photographed image information, to the Nth photographed image information. The feature amount collection regions 221 set to the Nth photographed image information do not exceed half the short side. Furthermore, if any of the feature amount collection regions 221 extends outside the photographed image information, the extending part is trimmed. FIG. 6 shows an example of a state in which the feature amount collection regions 221 are set to the Nth photographed image information.

The keystone correction processing unit 22 collects local feature amounts from the feature amount collection regions 220 set to the N−1th photographed image information, and stores feature points in the local feature amounts and a set of coordinates of the feature points. In addition, the keystone correction processing unit 22 collects local feature amounts from the feature amount collection regions 221 set to the Nth photographed image information, and stores feature points in the local feature amounts and a set of coordinates of the feature points.

Figure 7:
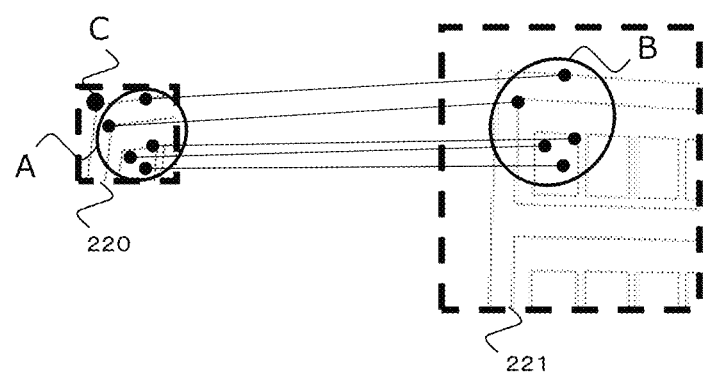
FIG. 7 is a diagram showing a relationship between pairs of N–1th feature amount collection regions and Nth feature amount collection regions.

The keystone correction processing unit 22 compares the local feature amounts of the feature points in the feature amount collection regions 220 in the N−1th photographed image information with the local feature amounts of the feature points in the feature amount collection regions 221 in the Nth photographed image information located at positions corresponding to the feature amount collection regions 220 in the N−1th photographed image information. Then, the keystone correction processing unit 22 specifies the feature points with the local feature amounts in the Nth photographed image information that are closest to the local feature amounts of the feature points in the N−1th photographed image information. Then, the keystone correction processing unit 22 pairs the feature points of the closest local feature amounts, and associates the coordinates of the feature points with the paired local feature amounts. At this time, the pairs of which closeness (similarity) between the local feature amounts is less than a predetermined threshold are excluded. This makes it possible to specify the pairs of the feature points with the local feature amounts in the N−1th feature amount collection region 220 and the feature points with the closest local feature amounts in the Nth feature amount collection region 221. FIG. 7 shows the relationship between the pairs of the feature points with the local feature amounts in the N−1th feature amount collection region 220 and the feature points with the local feature amounts in the Nth feature amount collection region 221. FIG. 7 shows a group of the feature points with the local feature amounts in the N−1th feature amount collection region 220 with sign A, shows a group of the feature points with the local feature amounts in the Nth feature amount collection region 221 with sign B, and shows the vertex used in the N−1th keystone correction process with sign C.

The keystone correction processing unit 22 determines a function F (affine transformation) of projecting the point group A onto the point group B, based on the coordinates of the point group A of the feature points with the local feature amounts in the N−1th feature amount collection region 220 and the coordinates of the point group B of the feature points with the local feature amounts in the Nth feature amount collection region 221 corresponding to the point group A. The function F includes methods such as, but not limited to, iterating sampling estimation and using RANSAC of OpenCV which is a kind of robust estimation. The pairs having a large deviation from the relationship line in the projective relationship are excluded from the processing target.

Figure 8:
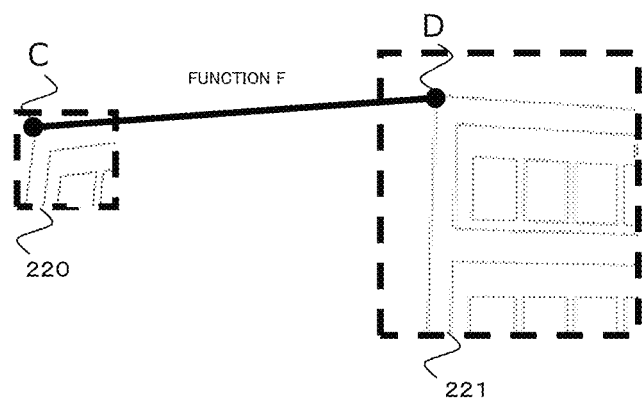
FIG. 8 is a diagram showing a state in which a shelf position C in the N–1th photographed image information is projected by a function F as a shelf position D in the Nth photographed image information.

After obtaining the function F, the keystone correction processing unit 22 projects the coordinates of the vertex C used in the N−1th keystone correction process onto the Nth photographed image information based on the function F. Then, the keystone correction processing unit 22 specifies the projected coordinates as coordinates of a vertex D for the Nth keystone correction process. FIG. 8 schematically illustrates this.

By performing the above processing on the feature amount collection regions 220 and 221, the keystone correction processing unit 22 specifies the four vertexes of the shelf position for the keystone correction processing in the Nth photographed image information. The keystone correction processing unit 22 performs the keystone correction process on the Nth photographed image information based on the four specified vertexes so that the image faces the front, and stores the front-facing image information in the front-facing image information storage unit 24. At this time, the keystone correction processing unit 22 stores the front-facing image information in the front-facing image information storage unit 24 in association with the photographing date and time information, the store information, the image information identification information for the photographed image information, and the image identification information for the front-facing image information. The keystone correction processing unit 22 stores the coordinates of the vertexes corresponding to the specified Nth photographed image information in the vertex coordinate storage unit 23 in association with the photographing date and time information, the store information, and the image information identification information for the photographed image information.

The process of specifying the vertexes to be used in the keystone correction process by the keystone correction processing unit 22 is not limited to specification of merchandise from image information obtained by photographing a display shelf as in the present invention, but is also applicable to an image processing system that corrects a plurality of pieces of image information obtained by photographing the same target object so as to face the front, thereby to generate front-facing image information. This makes it possible to correct a plurality of pieces of image information obtained by photographing the same target object so as to face the front, thereby generating the front-facing image information of the target object.

In addition, in the above-described process for specifying four vertexes of a shelf position for the keystone correction process on the Nth photographed image information, the function F is determined using the point group A of the feature points with the local feature amounts in the feature amount collection region 220 in the N−1th photographed image information and the point group B of the feature points with the local feature amounts in the feature amount collection region 221 in the Nth photographed image information, the coordinates o the vertex C used in the N−1th keystone correction process is projected onto the Nth photographed image information by the function F, and the coordinates are specified as the coordinate of the vertex D for the Nth keystone correction process. However, this process is merely intended to find the coordinates (positions) of corresponding points of the similar image information between N−1th photographed image information and the Nth photographed information, and thus the foregoing method does not necessarily need to be employed but any method using a type of feature amounts that specify places in image information can be employed. For example, there are sharp places, highlight points, and the like in image information. Herein, a feature amount that specifies a place in image information, such as a local feature amount, is referred to as an image feature amount (position-specifying image feature amount). In the description below, the local feature amount is used as the image feature amount as described above.

The vertex coordinate storage unit 23 stores the coordinate information of the four vertexes to be used in the keystone correction process by the keystone correction processing unit 22. The coordinate information is associated with the photographing date and time information, the store information, and the image information identification information for the photographed image information.

The front-facing image information storage unit 24 stores the front-facing image information that has been subjected to the keystone correction process by the keystone correction processing unit 22. The front-facing image information storage unit 24 preferably stores the front-facing image information in association with the photographing date and time information, the store information, the image information identification information for the photographed image information, and the image identification information for the front-facing image information.

Figure 9:
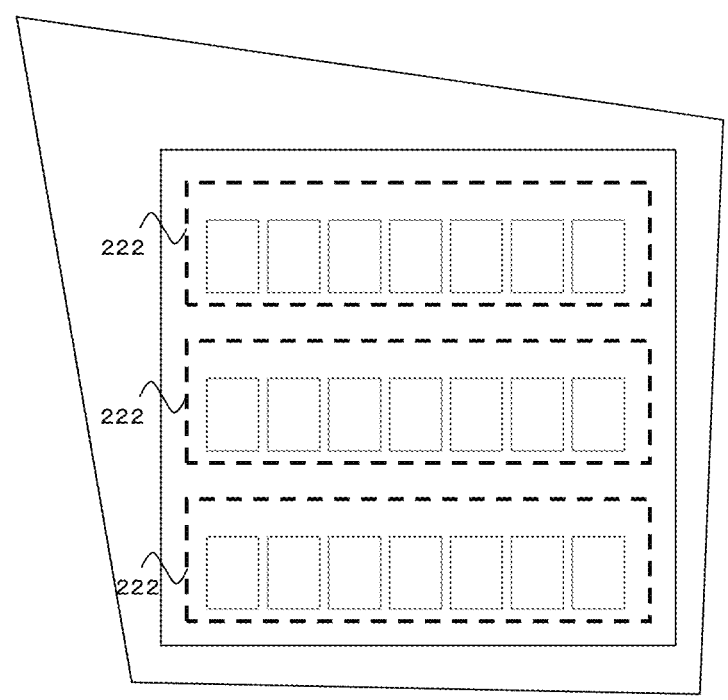
FIG. 9 is a diagram showing an example of shelf tier positions that have been designated.

The shelf tier position specification processing unit 25 accepts an input of the position of the shelf tier in the display shelf seen in the front-facing image information. As the designation of the shelf tier position, the designation of the region 222 is accepted, and the four points are set as the coordinates of the shelf tier position. The coordinates constituting the accepted shelf tier region 222 are stored in the shelf tier position coordinate storage unit 26. The coordinates constituting the shelf tier region 222 are preferably stored in association with the photographing date and time, the store identification information, the image information identification information for photographed image information, and the image information identification information for the front-facing image information. The coordinates are relative coordinates with reference to a predetermined place in the display shelf (for example, a vertex C1 at the upper left of the display shelf) in the front-facing image information. FIG. 9 shows an example of the shelf tier regions 222 of which designation has been accepted. For the same display shelf, the coordinates constituting the shelf tier region 222 of the N–1th front-facing image information are specified as the coordinates constituting the Nth shelf tier region 222.

The shelf tier position coordinate storage unit 26 stores coordinates constituting the shelf tier region 222 in the front-facing image information. For example, the shelf tier position coordinate storage unit 26 stores the coordinates constituting the shelf tier region 222 in association with the photographing date and time, the store information, the image information identification information for photographed image information, the image identification information for the front-facing image information.

The face specification processing unit 27 specifies the faces on which the merchandise is placed in each shelf tier in the front-facing image information. The face specification processing unit 27 is divided into a first face specification process and second and subsequent face specification processes.

In the first face specification process, the face specification processing unit 27 specifies the regions (faces) in which merchandise is placed within the range of the region 222 (preferably rectangular region) formed by the coordinates of the shelf tier position stored in the shelf tier position coordinate storage unit 26. Specifically, the face specification processing unit 27 specifies the regions of faces by specifying shadow between pieces of merchandise, specifying image repetition patterns, specifying differences in height between the tops of packages, specifying separation positions based on a condition that the merchandise width is the same, or the like. The method for the face specification process is not limited to the foregoing one but any method can be adopted depending on the merchandise category and the merchandise form. For automatically specified faces, correction inputs by a person in charge may be accepted. Furthermore, an input of a face position from a person in charge may be accepted. The face specification processing unit 27 stores the coordinates of the regions constituting the specified faces in the face face coordinate storage unit 28. At this time, the face specification processing unit 27 stores the coordinates of the regions of the faces in the front-facing image information in association with the photographing date and time information, the store information, the image information identification information for the photographed image information, the image identification information for the front-facing image information, and face identification information for identifying the faces. Further, the coordinates indicating each face region is the coordinates of the vertexes necessary for specifying the rectangular region, and may be, for example, the coordinates of four points, or the coordinates of two points at the upper right and lower left or the upper left and lower right.

In the second and subsequent face specification processes, for the same shelf tier in the same display shelf, the face specification processing unit 27 extracts the coordinates of regions of the faces specified by the previous (N–1th) front-facing image information stored in the face coordinate storage unit 28, and sets these coordinates as the coordinates of regions of the faces specified by the current (Nth) front-facing image information.

As with the coordinates of position of the shelf tier, the coordinates of region of each face are relative coordinates with reference to a predetermined place in the display shelf (for example, a vertex C1 at the upper left of the display shelf) in the front-facing image information.

The face coordinate storage unit 28 stores the coordinates of regions of the faces. For example, At this time, the face coordinate storage unit 28 stores the coordinates of the regions of the faces in the front-facing image information in association with the photographing date and time information, the store information, the image information identification information for the photographed image information, the image identification information for the front-facing image information, and face identification information for identifying the faces.

The merchandise identification information specification processing unit 29 specifies the merchandise identification information of the merchandise displayed in the faces on each shelf tier of the display shelf. The merchandise identification information includes, in addition to the merchandise name, a JAN code assigned to the merchandise, but is not limited thereto. Any information can be used as long as it can specify the merchandise.

The merchandise identification information specification processing unit 29 is divided into the first merchandise identification information specification process and the second and subsequent merchandise identification information specification processes.

In the first merchandise identification information specification process, the merchandise identification information specification processing unit 29 matches the image information of each face and merchandise sample image information stored in the sample image information storage unit 30 described later to specify the merchandise identification information of the merchandise displayed in the face. Specifically, first, the merchandise identification information specification processing unit 29 specifies the coordinates of the face to be processed from the face coordinate storage unit 28. Then, the merchandise identification information specification processing unit 29 determines similarity between the image information of the region constituted by the coordinates and the sample image information stored in the sample image information storage unit 30, and specifies the merchandise identification information corresponding to the sample image information with the highest degree of similarity as the merchandise identification information of the merchandise displayed in the face constituted by the coordinates.

Here, in order to determine the similarity between the face image information and the sample image information, the merchandise identification information specification processing unit 29 performs the process described below. First, in the process before the merchandise identification information specification process by the merchandise identification information specification processing unit 29, the image information of the face regions in the front-facing image information and the sample image information are oriented in the same direction (not overturned or inverted), and are of almost the same size (if there is a difference in size between the face image information and the sample image information beyond a predetermined range, the two are resized to fall within the predetermined range before the determination of similarity). The merchandise identification information specification processing unit 29 determines the similarity between the face image information and the sample image information by extracting feature points based on the image feature amount (for example, local feature amount) of the face image information and feature points based on the image feature amount (for example, local feature amount) of the sample image information. Then, the merchandise identification information specification processing unit 29 detects a pair of feature points with the highest degree of similarity between the feature points of the face image information and the feature points of the sample image information, and determines the difference between the corresponding coordinates of the points. The merchandise identification information specification processing unit 29 determines the average value of the difference. The average value of the difference indicates the total average movement amount of the face image information and the sample image information. Then, the merchandise identification information specification processing unit 29 compares the coordinate differences between all the pairs of feature points with the average coordinate difference to exclude pairs with a high degree of deviation. Subsequently, the merchandise identification information specification processing unit 29 ranks the remaining corresponding points by similarity.

The similarity between the face image information and the sample image information can be calculated by the method as described above. In order to improve the accuracy, Earth Movers Distance (EMD) between color histograms may be obtained and used as a measure of similarity. This allows comparison of similarities relatively resistant to changes in environment such as the brightness of photographed image information and achieves high-accuracy specification. The similarity determination is not limited to the above. The merchandise identification information specification processing unit 29 stores the specified merchandise identification information in the merchandise identification information storage unit 31 in association with the photographing date and time information, the store information, the image information identification information for the photographed image information, the image identification information for the front-facing image information, and the face identification information for identifying the faces.

The merchandise identification information specification processing unit 29 executes the second and subsequent merchandise identification information specification processes as follows. In the merchandise identification information specification process on a face in the Nth front-facing image information, the merchandise identification information specification processing unit 29 specifies face identification information of the face to be processed from the face coordinate storage unit 28. The specified face identification information will be designated as X. Then, the merchandise identification information specification processing unit 29 compares the image information of the region of the face identification information X in the Nth front-facing image information with the image information of the region in the N−1th front-facing image information at a position corresponding to the face identification information X. For similarity determination, it is preferable to obtain EMD between color histograms and use the same as a measure of similarity, but the determination method is not limited to this. If the similarity is equal to or greater than a specific threshold, the merchandise identification information specification processing unit 29 extracts the merchandise identification information corresponding to the face of the region in the N−1th front-facing image information from the merchandise identification information storage unit 31, and sets the extracted information as the merchandise identification information of the face identification information X in the Nth front-facing image information. Thereby, the merchandise identification information of the face identification information X in the Nth front-facing image information to be processed can be specified. If the similarity is smaller than the specific threshold, as in the first case, the merchandise identification information specification processing unit 29 compares the image information of the region of the face identification information X in the Nth front-facing image information with the sample image information stored in the sample image information storage unit 30, and specifies the merchandise identification information with the degree of similarity that is greater than the predetermined threshold and is highest as the merchandise identification information of the face of the face identification information X in the Nth front-facing image information.

In the comparison with the image information of the face region in the N−1th front-facing image information, the comparison target may include not only the corresponding face but also faces in a predetermined range. For example, when comparing with the image information of the region of the face identification information X in the Nth front-facing image information, the comparison target may include the faces in the region of the face identification information X in the N−1th front-facing image information and the faces in a predetermined range from that region, for example, the faces at positions separated by one or more in the horizontal direction and the faces positioned on the upper and lower shelf tiers. Furthermore, the comparison target may include, in addition to the region of face identification information X in the N−1th front-facing image information, a plurality of adjacent faces such as face identification information X−2, X−1, X, X+1, and X+2.

Figure 10:
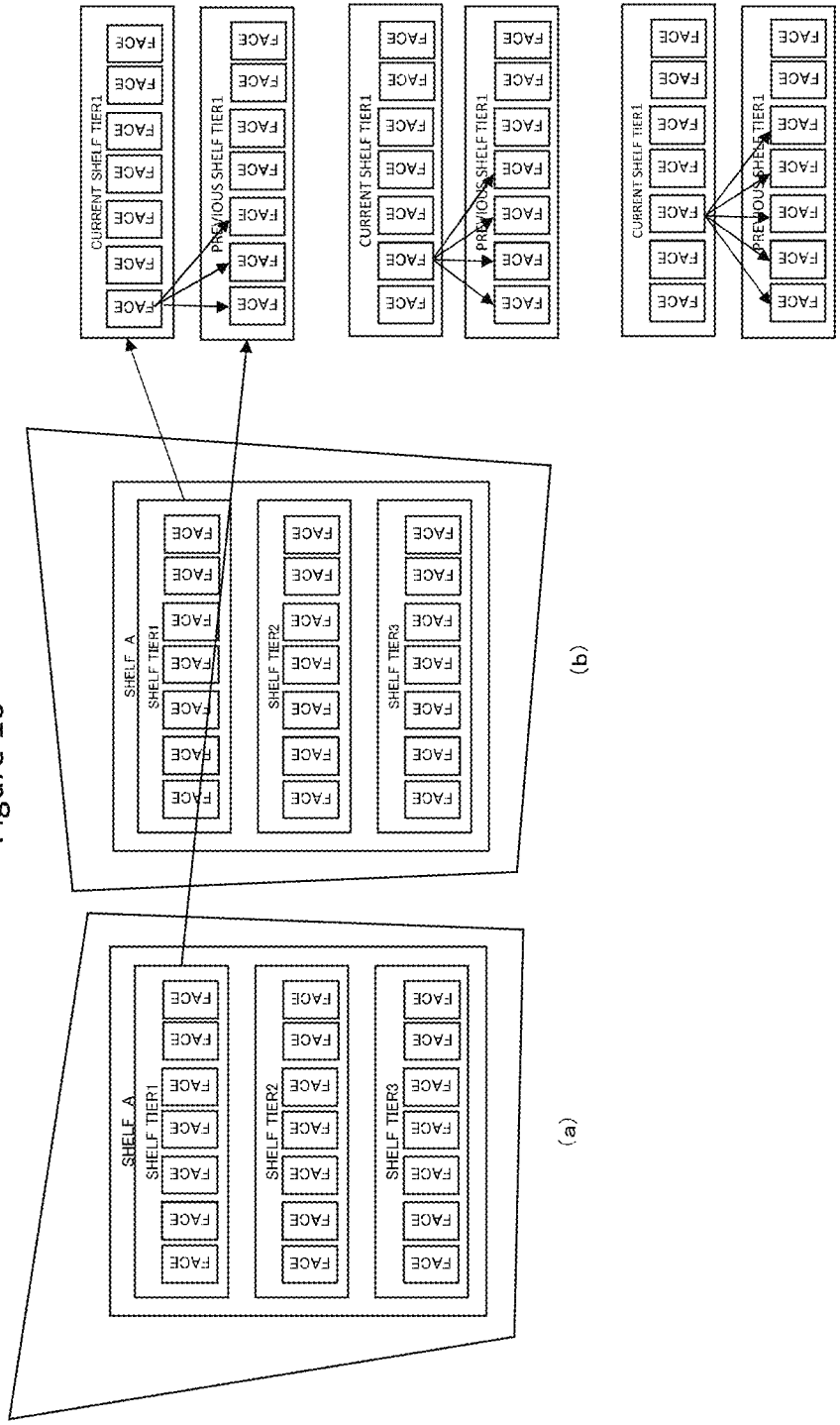
FIG. 10 is a diagram schematically showing a process of specifying merchandise identification information in the units of faces in a merchandise identification information specification processing unit.

In this case, the merchandise identification information specification processing unit 29 compares the image information of the region of the face identification information X in the Nth position image information with the image information of the region of the face range of the range to be compared in the N−1th position image information, thereby to specify the face identification information of the N−1th front-facing image information with the highest degree of similarity. Note that the similarity may be a condition that the similarity is equal to or greater than a specific threshold. Then, the merchandise identification information specification processing unit 29 extracts the merchandise identification information corresponding to the specified face identification information in the N−1th front-facing image information from the merchandise identification information storage unit 31, and sets the extracted information as the merchandise identification information of the face identification information X in the Nth front-facing image information. FIG. 10 schematically illustrates this process. FIG. 10(*a*) shows the previous (N−1th) front-facing image information, and FIG. 10(*b*) shows the current (Nth) front-facing image information. FIG. 10 shows that the image information of the region of each face on a shelf tier 1 in the Nth front-facing image information is compared with the image information of the region of each face on the shelf tier 1 in the N−1th front-facing image information, and the merchandise identification information of the face on the shelf tier 1 in the N−1th front-facing image information with the highest degree of similarity is specified as the merchandise identification information of the face on the shelf tier 1 in the Nth front-facing image information. FIG. 10 shows the case where comparison is made with, in addition to the face in the N−1th front-facing image information at the position corresponding to the face in the Nth front-facing image information, two each right and left faces. Note that comparison may be made with the image information of the face positions on the upper and lower shelves as well as the same shelf. For example, in the case of FIG. 10, in order to specify merchandise identification information of the face in the center of a shelf tier 2 in the Nth front-facing image information, not only comparison may be made with the image information of the face in the center and the two faces each on the right and left of the central face on the shelf tier 2 in the N−1th front-facing image information but also comparison may be made with the image information of the face in the center and the two faces each on the right and left of the central face on the shelf tier 1 in the N−1th front-facing image information and the image information of the face in the center and the two each faces on the right and left of the central face on a shelf tier 3 in the N−1th front-facing image information for determination of similarity.

If it is found as a result of the comparison with the image information of the faces in the N−1th front-facing image information that the merchandise identification information cannot be specified because the similarity does not satisfy the threshold or the like, the merchandise identification information specification processing unit 29 compares the image information of the region of the face identification information X in the Nth front-facing image information with the sample image information stored in the sample image information storage unit 30, and specifies the merchandise identification information with the degree of similarity that is greater than the predetermined threshold and is highest as the merchandise identification information of the face of the face identification information X in the Nth front-facing image information. In this case, the similarity determination process can be performed in the same manner as the first merchandise identification information specification process.

The merchandise identification information specification processing unit 29 stores the thus specified merchandise identification information in the merchandise identification information storage unit 31 in association with the photographing date and time information, the store information, the image information identification information for the photographed image information, the image identification information for the front-facing image information, and the face identification information for identifying the faces.

Figure 25:
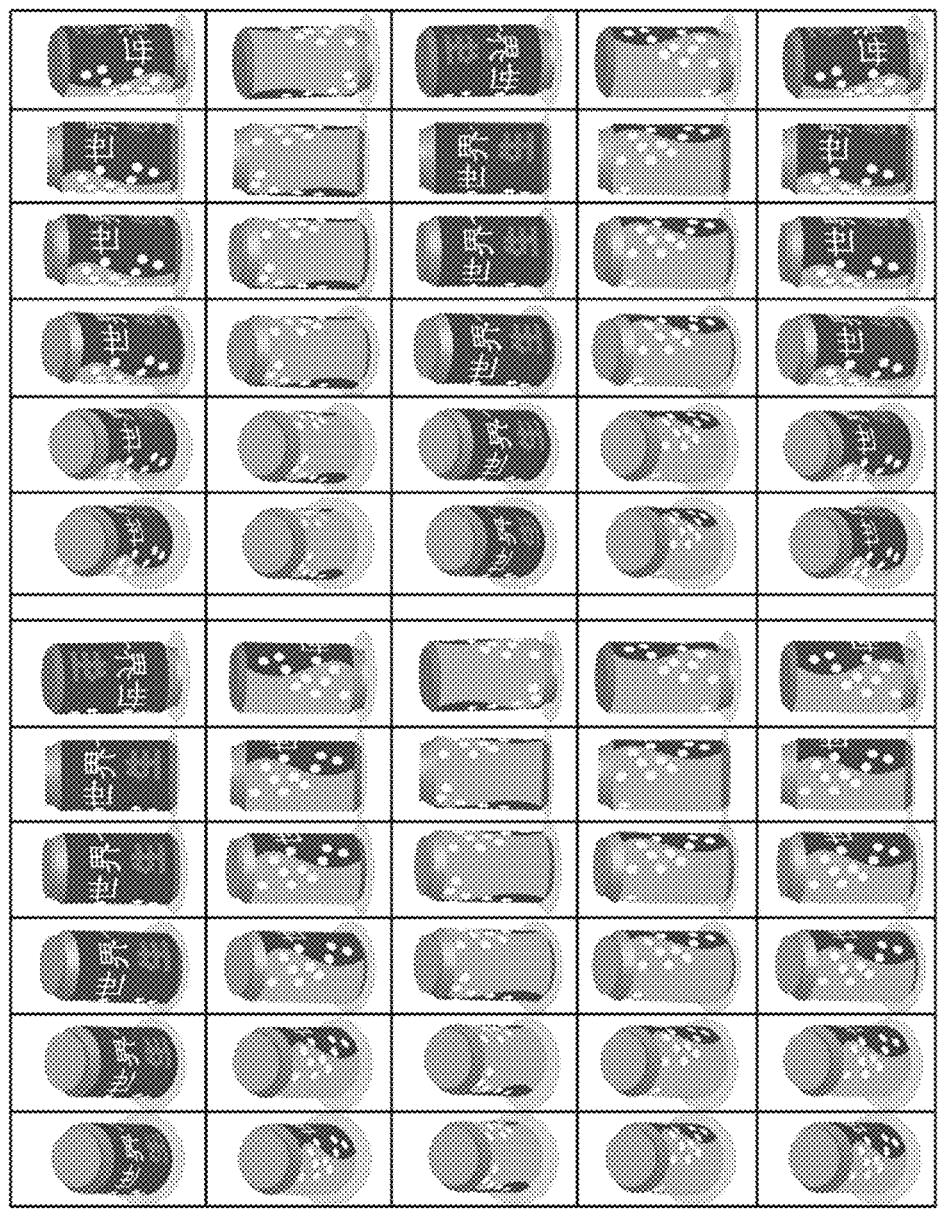
FIG. 25 is a diagram showing an example of sample image information stored in a sample image information storage unit.

The sample image information storage unit 30 stores sample image information for identifying which merchandise is placed on each face in the shelf tiers of the display shelf seen in the front-facing image information. The sample image information is image information obtained by photographing merchandise that may be displayed on a display shelf from a plurality of angles such as vertical, horizontal, and diagonal angles. FIG. 25 shows an example of sample image information stored in the sample image information storage unit 30. FIG. 25 shows the case where cans of beer are photographed from various angles as sample image information, but the subject of the sample image information is not limited to cans of beer. The sample image information storage unit 30 stores sample image information and merchandise identification information in association with each other.

In addition to or instead of the sample image information, the sample image information storage unit 30 may store information that is extracted from the sample image information and is necessary for calculation of similarity, for example, information on pairs of image feature amounts and positions. The sample image information includes information necessary for calculation of similarity. In this case, the merchandise identification information specification processing unit 29 does not have to calculate the image feature amounts of the sample image information at each execution of the matching process between the image information of the face regions and the sample image information, thereby achieving shortening of the calculation time.

The merchandise identification information storage unit 31 stores merchandise identification information of merchandise displayed on each face on the shelf tiers of the display shelf. For example, the merchandise identification information storage unit 31 stores the merchandise identification information in association with the photographing date and time information, the store information, the image information identification information for the photographed image information, the image identification information for the front-facing image information, and the face identification information for identifying the faces.

When the degree of similarity between the image information of the shelf tier regions 222 in the previous (N−1th) front-facing image information and the image information of the shelf tier regions 222 in the current (Nth) front-facing image information is high, the shelf tier image matching processing unit 32 determines that the merchandise identification information of the faces on that tier is identical. As described above, the similarity determination process may be performed by determining the similarity between the image feature amounts of the image information of the shelf tier regions 222 in the previous (N−1th) front-facing image information and the image information of the shelf tier regions 222 in the current (Nth) image information, or may be performed using EMDs between color histograms. Moreover, the method for the similarity determination is not limited to the foregoing ones. Instead of performing the specification process in the unit of faces by the merchandise identification information specification processing unit 29, the merchandise identification information specification processing unit 29 determines that the merchandise identification information of each face on the shelf tier in the Nth front-facing image information is identical to the merchandise identification information of each face on the same shelf tier in the N−1th front-facing image information, and stores the merchandise identification information in the merchandise identification information storage unit 31. As a result, it is possible to omit processing for shelf tiers that are hardly changed, such as shelf tiers where merchandise is not moved much and shelf tiers that are managed in a very short cycle. Note that the processing by the shelf tier image matching processing unit 32 may not be provided.

Figure 3:
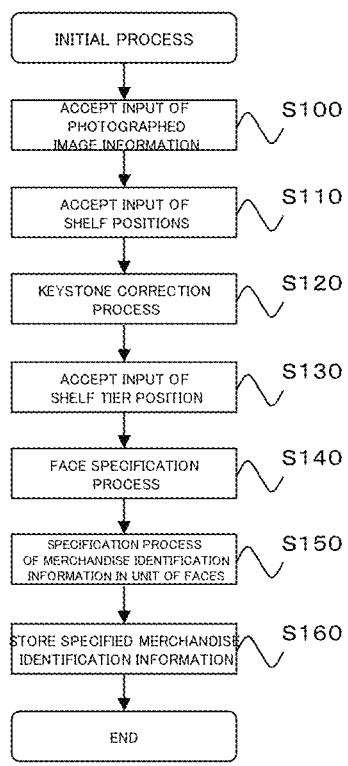
FIG. 3 is a flowchart showing an example of an initial process in the merchandise specification system of the present invention.
Figure 4:
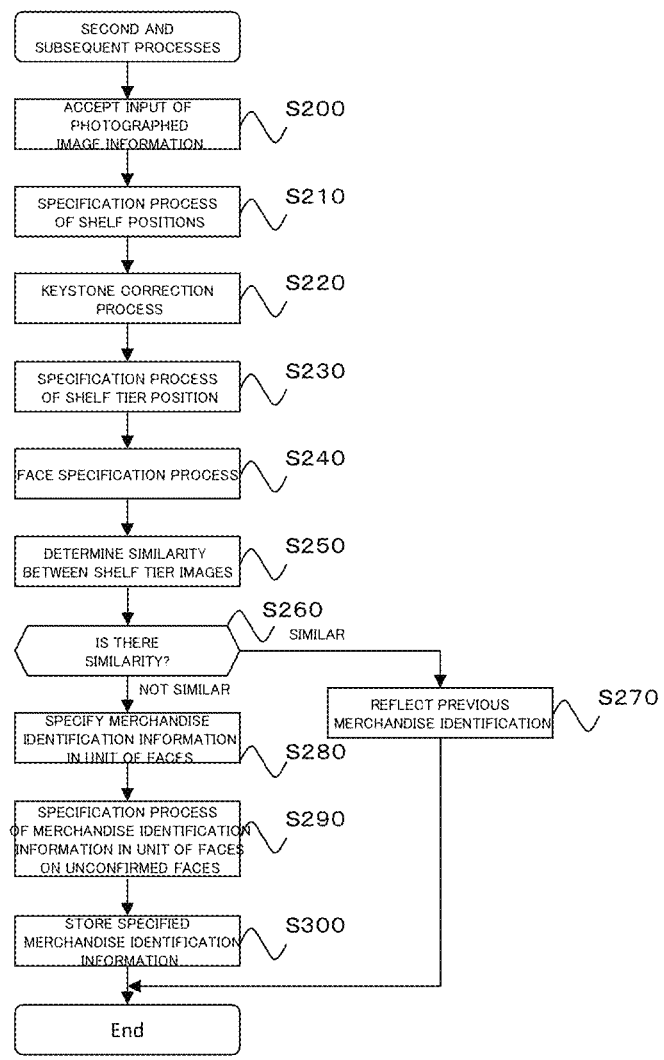
FIG. 4 is a flowchart showing an example of the second and subsequent processes in the merchandise specification system of the present invention.

Next, examples of processes in the merchandise specification system 1 of the present invention will be described with reference to flowcharts shown in FIGS. 3 and 4.

First, the first process will be described with reference to the flowchart shown in FIG. 3.

Figure 11:
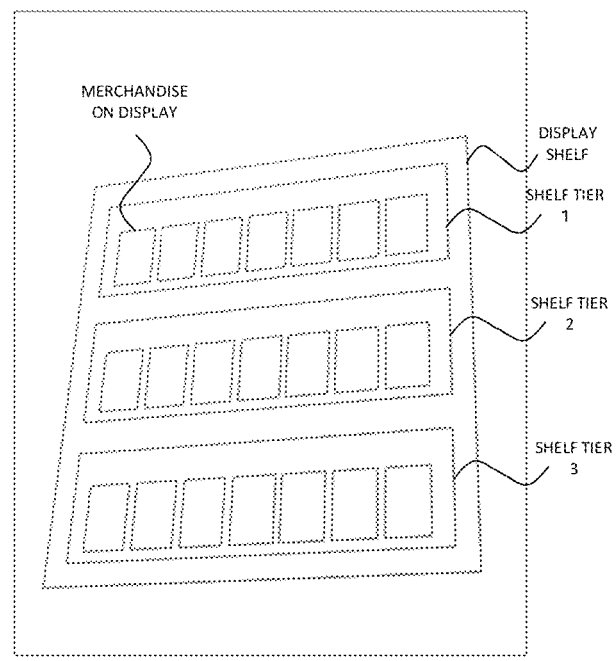
FIG. 11 is a diagram showing an example of photographed image information.

The photographed image information obtained by photographing an in-store display shelf is input from the photographed image information input terminal 3, and the input is accepted by the photographed image information input acceptance processing unit 20 of the management terminal 2 (S100). FIG. 11 shows an example of photographed image information. In addition, the photographed image information input acceptance processing unit 20 accepts inputs of photographing date and time, store identification information, and image information identification information for the photographed image information. Then, the photographed image information input acceptance processing unit 20 stores the accepted photographed image information, photographing date and time, store identification information, and image information identification information for the photographed image information in the photographed image information storage unit 21 in association with one another.

Figure 12:
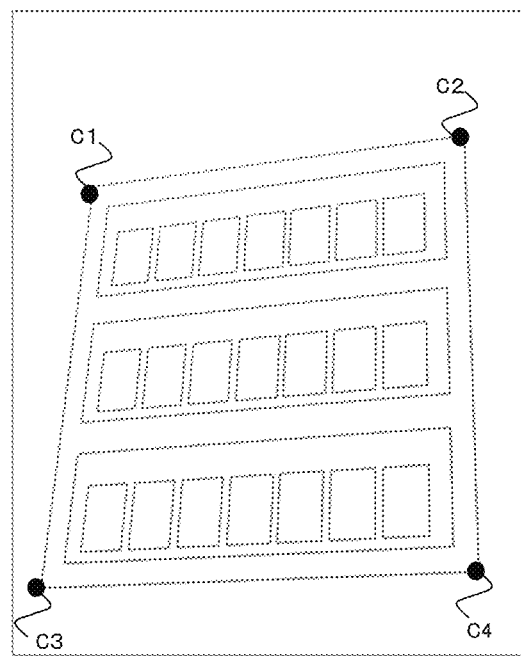
FIG. 12 is a diagram showing an example of a state in which an input of shelf positions C1 to C4 to the photographed image information shown in FIG. 11 is accepted.
Figure 13:
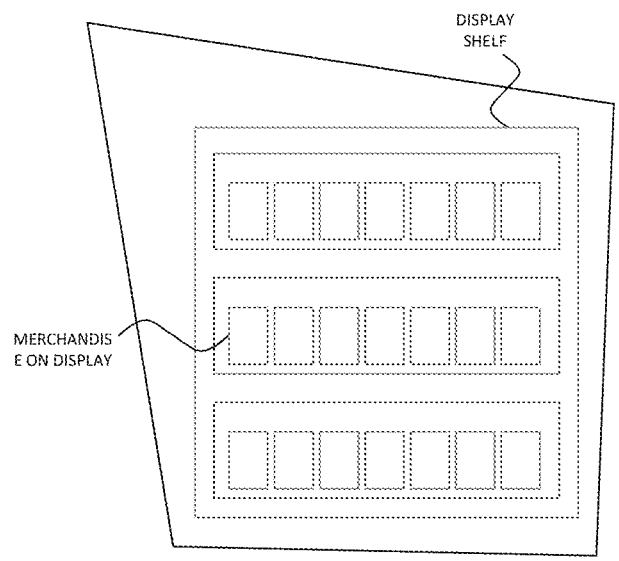
FIG. 13 is a diagram showing an example of front-facing image information obtained by performing a keystone correction process on the photographed image information shown in FIG. 11.

Upon receipt of a predetermined operation input at the management terminal 2, the keystone correction processing unit 22 extracts the photographed image information from the photographed image information storage unit 21 and accepts an input of four points C (C1 to C4) at shelf positions (positions on the display shelf) that are vertexes for performing the keystone correction process (S110). FIG. 12 shows an example of a state in which an input of the shelf positions C1 to C4 to the photographed image information shown in FIG. 11 is accepted. The keystone correction processing unit 22 stores the coordinates C1 to C4 of the shelf positions of which an input has been accepted in the vertex coordinate storage unit 23 in association with the photographing date and time, the store identification information, and the image information identification information for the photographed image information. Based on the coordinates of the shelf positions (vertexes C1 to C4) of which an input has been accepted, the keystone correction processing unit 22 executes the keystone correction process on the photographed image information so as to face the front, thereby to generate the front-facing image information (S120). The keystone correction processing unit 22 stores the generated front-facing image information in the front-facing image information storage unit 24 in association with the photographing date and time, the store identification information, the image information identification information for the photographed image information, and the image information identification information for the front-facing image information corresponding to the photographed image information before the keystone correction process. FIG. 13 shows the front-facing image information obtained by performing the keystone correction process on the photographed image information shown in FIG. 11 so as to face the front.

Figure 14:
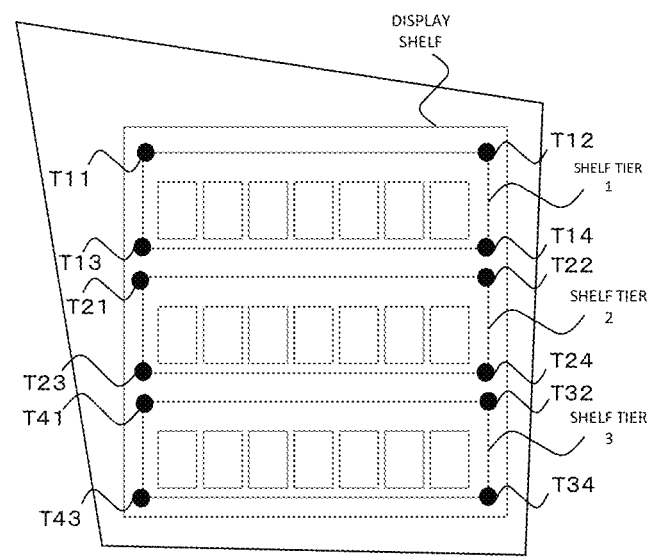
FIG. 14 is a diagram showing an example in which designation of shelf tier positions to the front-facing image information shown in FIG. 13 is accepted.

The shelf tier position specification processing unit 25 extracts the front-facing image information from the front-facing image information storage unit 24 and accepts an input of designation of the shelf tier position (S130). The shelf tier position specification processing unit 25 stores the coordinates of shelf tier positions T (the regions 222 shown in FIG. 9) of which designation has been accepted in the shelf tier position coordinate storage unit 26 in association with the photographing date and time, the store identification information, the image information identification information for the photographed image information, and the image information identification information for the front-facing image information. FIG. 14 shows an example of shelf tier positions T of which designation has been accepted. Referring to FIG. 14, the shelf tier position specification processing unit 25 accepts designation and input of the shelf tier positions on a shelf tier 1 by coordinates T11 to T14, the shelf tier positions on a shelf tier 2 by coordinates T21 to T24, and the shelf tier positions on a shelf tier 3 by coordinates T31 to T34. Each shelf tier constitutes a rectangular region 222 formed by the coordinates of four points. The coordinates of each shelf tier position may not be represented by four points but may be represented by two points capable of specifying the rectangular regions 222 such as T11 and T14.

Figure 15:
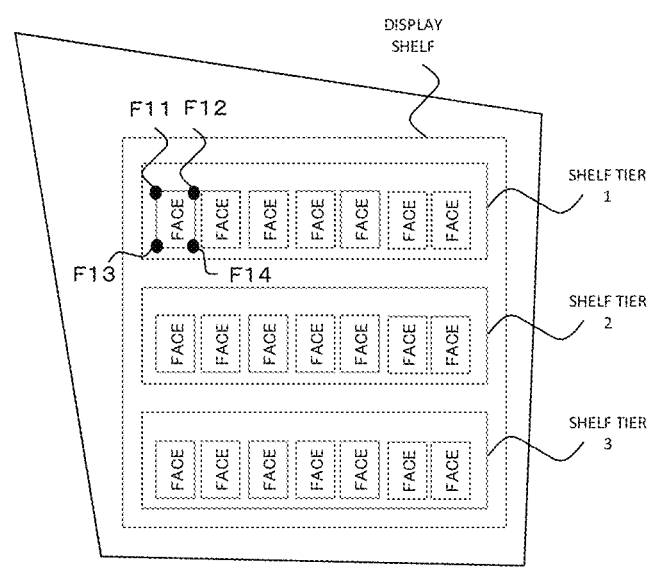
FIG. 15 is a diagram showing an example of front-facing image information in which face positions are specified.

Then, the face specification processing unit 27 executes a process of specifying faces on each shelf tier based on the shelf tier position of which the input has been accepted in S130 (S140). Specifically, within the range of the rectangular region 222 constituted by the coordinates T11 to T14 on the shelf tier 1, the face specification processing unit 27 specifies the faces by specifying shadow between pieces of merchandise, specifying image repetition patterns, specifying differences in height between the tops of packages, specifying separation positions based on a condition that the merchandise width is the same, or the like. Further, within the range of the rectangular region 222 constituted by the coordinates T21 to T24 on the shelf tier 2 and the range of the rectangular region 222 constituted by the coordinates T31 to T34 on the shelf tier 3, the face specification processing unit 27 specifies the faces in the same manner as on the shelf tier 1. FIG. 15 shows an example of front-facing image information in which the faces are specified. The face specification processing unit 27 stores the specified face coordinates in the face coordinate storage unit 28 in association with the photographing date and time, the store identification information, the image information identification information for the photographed image information, the image information identification information for the front-facing image information, and the face identification information for identifying the faces. For example, the face specification processing unit 27 stores the coordinates (F11 to F14) of the leftmost face on the shelf tier 1 shown in FIG. 15 in association with the shooting date and time, the store identification information, the image information identification information for the photographed image information, the image information identification information for the front-facing image information, and the face identification information. The coordinates of the face may not be represented by four points but may be represented by two points capable of specifying the rectangular region such as F11 and F14.

After specifying each face on each shelf tier in the front-facing image information, the merchandise identification information specification processing unit 29 performs a matching process with the sample image information stored in the sample image information storage unit 30 for each face, thereby to specify the merchandise identification information of the merchandise displayed on the face (S150). Specifically, taking the leftmost face on the shelf tier 1 shown in FIG. 15, the merchandise identification information specification processing unit 29 calculates the image feature amounts from the image information in the rectangular region of the coordinates F11 to F14 in the front-facing image information (the face identification information of the face in this region will be designated as X) and from each sample image information stored in the sample image information storage unit 30, and finds pairs of feature points to determine the similarity between the feature points. Then, the merchandise identification information specification processing unit 29 specifies the sample image information with the highest degree of similarity. When the similarity is equal to or greater than a predetermined threshold, the merchandise identification information specification processing unit 29 specifies the merchandise identification information corresponding to that sample image information based on the sample image information storage unit 30. Then, the merchandise identification information specification processing unit 29 sets the specified merchandise identification information as the merchandise identification information of the merchandise displayed on the face of the face identification information X. Then, the merchandise identification information specification processing unit 29 stores the specified merchandise identification information in the merchandise identification information storage unit 31 in association with the photographing date and time, the store identification information, the image information identification information for the photographed image information, the image information identification information for the front-facing image information, and the face identification information (S160).

Note that all the merchandise identification information may not be specified. For the faces that cannot be specified, the merchandise identification information specification processing unit 29 accepts an input of merchandise identification information and stores the accepted merchandise identification information in the merchandise identification information storage unit 31 in association with the photographing date and time, the store identification information, the image information identification information for the photographed image information, the image information identification information for the front-facing image information, and the face identification information. Similarly, the merchandise identification information specification processing unit 29 may accept an input for a correction process of the specified merchandise identification information.

Performing the above process makes it possible to specify the merchandise identification information of the merchandise displayed on the shelf tiers of the display shelf seen in the photographed image information (FIG. 11).

Next, a case where the process of the present invention is executed on the photographed image information obtained by photographing a similar region on the same display shelf at a similar angle after a lapse of a predetermined period (for example, one week) will be described with reference to the flowchart shown in FIG. 4.

Figure 16:
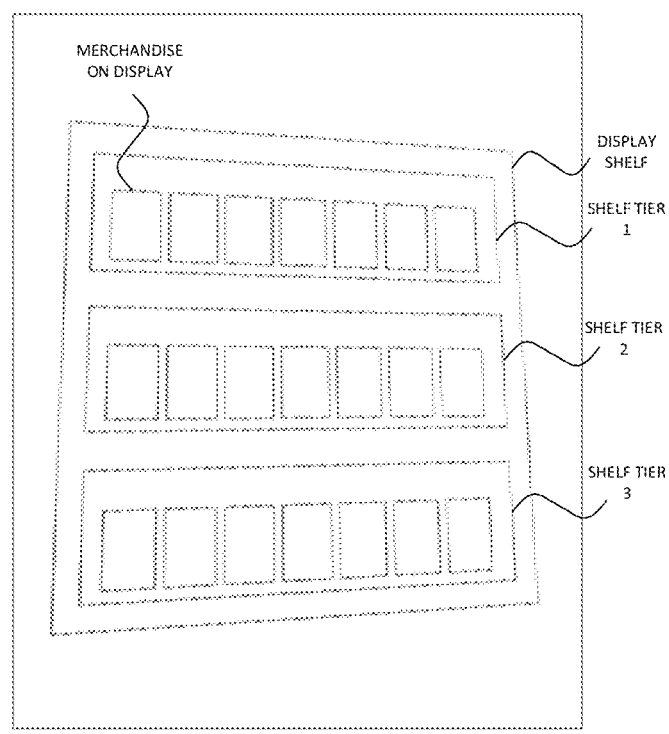
FIG. 16 is a diagram showing an example of Nth photographed image information.

The photographed image information obtained by photographing an in-store display shelf is input from the photographed image information input terminal 3, and the input is accepted by the photographed image information input acceptance processing unit 20 of the management terminal 2 (S200). FIG. 16 shows an example of photographed image information. In addition, the photographed image information input acceptance processing unit 20 accepts inputs of photographing date and time, store identification information, and image information identification information for the photographed image information. Then, the photographed image information input acceptance processing unit 20 stores the accepted photographed image information, photographing date and time, store identification information, and photographed image information in the photographed image information storage unit 21 in association with one another.

Upon receipt of a predetermined operation input at the management terminal 2, the keystone correction processing unit 22 extracts the photographed image information from the photographed image information storage unit 21 and performs a process of specifying vertexes D (D1 to D4) of the shelf positions for executing the keystone correction process (S210).

The keystone correction processing unit 22 specifies the vertex coordinates of the previous (N−1th) photographed image information obtained by photographing the same or substantially the same region corresponding to the current (Nth) photographed image information (FIG. 16) from the vertex coordinate storage unit 23. That is, when the previous photographed image information is as shown in FIG. 11, the keystone correction processing unit 22 specifies the vertex coordinates C1 to C4 from the vertex coordinate storage unit 23. The keystone correction processing unit 22 can specify the vertex coordinates of the previous photographed image information based on the photographing date and time, the store identification information, the image identification information for the photographed image information, and the like.

Figure 17:
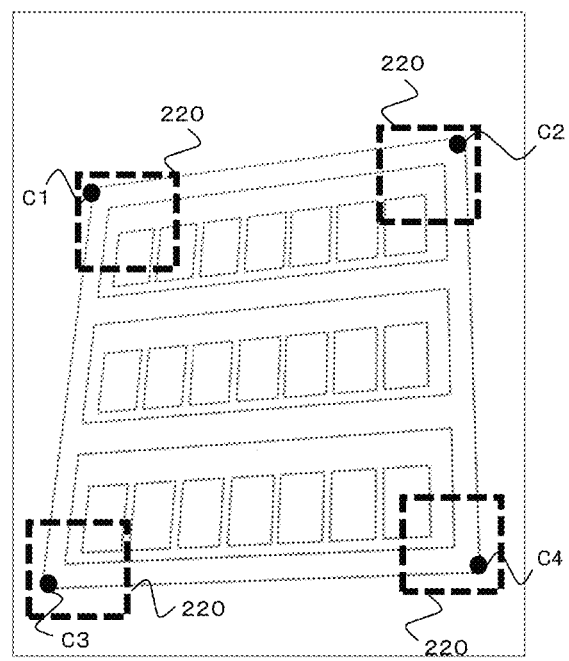
FIG. 17 is a diagram showing an example of a state in which feature amount collection regions are set to N−1th photographed image information.

The keystone correction processing unit 22 extracts the N−1th photographed image information (FIG. 11) from the photographed image information storage unit 21 and, for each of the vertexes C1 to C4, sets a rectangular region of a predetermined size including one vertex as a feature amount collection region 220 to the N−1th photographed image information. FIG. 17 shows a state in which the feature amount collection regions 220 are set to the N−1th photographed image information.

Figure 18:
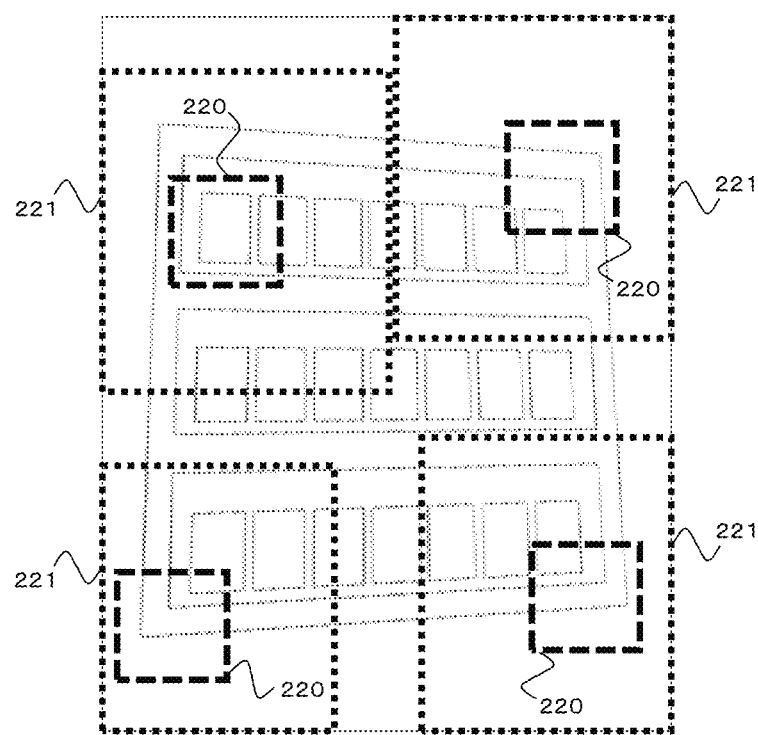
FIG. 18 is a diagram showing an example of a state in which feature amount collection regions are set to Nth photographed image information.

Further, the keystone correction processing unit 22 extracts the Nth photographed image information (FIG. 16) from the photographed image information storage unit 21, and sets the feature amount collection regions 221 wider than the N−1th feature amount collection regions 220 to the Nth photographed image information. FIG. 18 shows a state in which the feature amount collection regions 221 are set to the Nth photographed image information. Each feature amount collection region 221 in the Nth photographed image information includes one N−1th feature amount collection region 220.

The keystone correction processing unit 22 collects local feature amounts from the feature amount collection regions 220 set to the N−1th photographed image information, and stores feature points in the local feature amounts and a set of coordinates of the feature points. In addition, the keystone correction processing unit 22 collects local feature amounts from the feature amount collection regions 221 set to the Nth photographed image information, and stores feature points in the local feature amounts and a set of coordinates of the feature points.

The keystone correction processing unit 22 specifies the feature points of the local feature amounts of the feature amount collection regions 221 in the Nth photographed image information closest to the local feature amounts of the feature points in the feature amount collection regions 220 in the N−1th photographed image information, and associates the coordinates of the feature points of pairs of the local feature amounts. FIG. 7 shows a relationship between pairs of N−1th N−1th feature amount collection regions 220 and Nth feature amount collection regions 221.

Then, the keystone correction processing unit 22 determines a function F (affine transformation) of projecting a point group A onto a point group B, based on the coordinates of the point group A and the point group B, where A represents the point group of feature points with the local feature amounts in the N−1th feature amount collection regions 220, B represents the point group of feature points with the local feature amounts in the Nth feature amount collection regions 221, and C (C1 to C4) represents the vertexes used in the N−1th keystone correction process.

Then, the keystone correction processing unit 22 projects the coordinates of the vertexes C (C1 to C4) used in the N−1th keystone correction process based on the determined function F, and specifies the vertexes D (D1 to D4) for the Nth keystone correction process.

Figure 19:
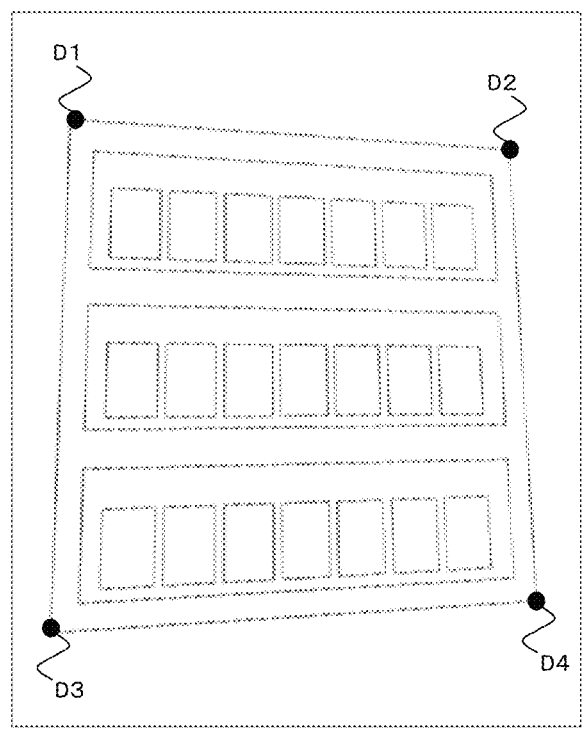
FIG. 19 is a diagram showing an example of a state in which shelf positions D1 to D4 are specified in Nth photographed image information.

Performing the foregoing processing on the feature amount collection regions 220 and 221 makes it possible to automatically specify the four vertexes D (D1 to D4) for the Nth keystone correction process. The keystone correction processing unit 22 stores the coordinates of the specified Nth vertexes D (D1 to D4) in the vertex coordinate storage unit 23 in association with the photographing date and time, the store identification information, and the image information identification information for the photographed image information. FIG. 19 shows the specified vertexes D1 to D4.

Figure 20:
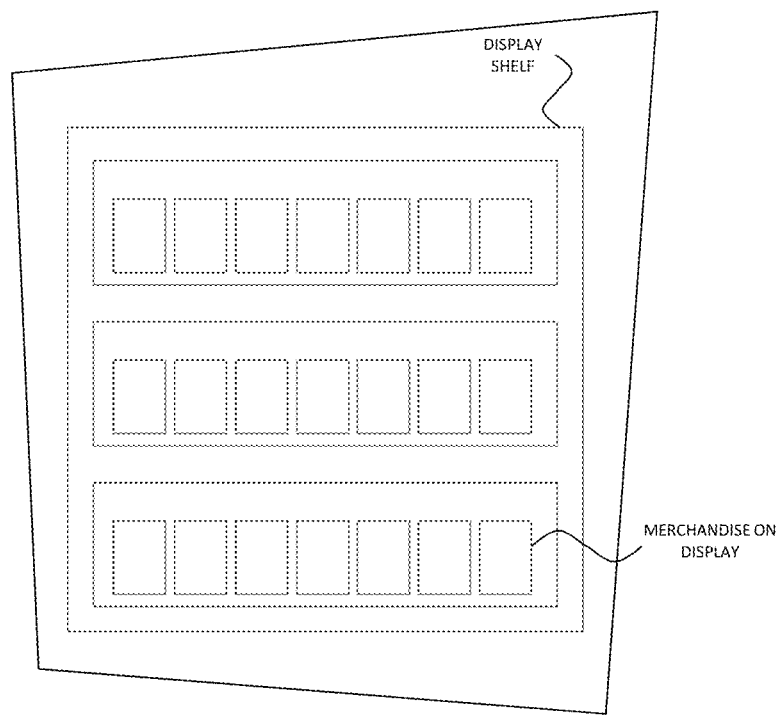
FIG. 20 is a diagram showing an example of front-facing image information obtained by performing a keystone correction process using the specified vertexes D1 to D4 on the photographed image information shown in FIG. 16.

As described above, after specifying the vertexes D (D1 to D4) of the shelf positions for the keystone correction process on the Nth photographed image information, the keystone correction processing unit 22 executes the keystone correction process on the Nth photographed image information based on the vertexes D (D1 to D4) (S220). The keystone correction processing unit 22 stores the front-facing image information obtained by correcting the Nth photographed image information so as to face the front in the front-facing image information storage unit 24 in association with the photographing date and time, the store identification information, the image information identification information for the photographed image information, and the image identification information for the front-facing image information corresponding to the photographed image information before the keystone correction process. FIG. 20 shows front-facing image information obtained by performing a keystone correction process using the specified vertexes D (D1 to D4) on the photographed image information shown in FIG. 16.

Figure 21:
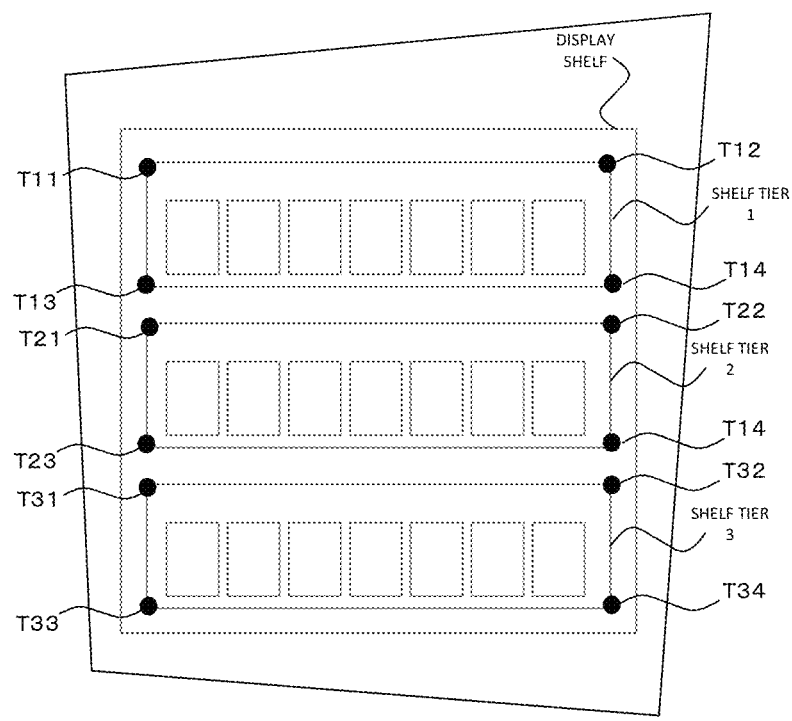
FIG. 21 is a diagram showing an example of a state in which the positions of shelf tiers of a display shelf shown in the Nth front-facing image information are specified.

Then, the shelf tier position specification processing unit 25 extracts the coordinates of the shelf tier positions corresponding to the N−1th front-facing image information from the shelf tier position coordinate storage unit 26, and sets the extracted coordinates as the coordinates of shelf tier positions on the display shelf seen in the Nth front-facing image information (FIG. 20). That is, the shelf tier position specification processing unit 25 extracts coordinates T11 to T14 on a shelf tier 1, coordinates T21 to T24 on a shelf tier 2, and coordinates T31 to T34 on a shelf tier 3 corresponding to the N−1th front-facing image information, and specifies the shelf tier positions from the coordinates as the coordinates of the shelf tier 1, shelf tier 2, and shelf tier 3 on the display shelf in the Nth front-facing image information (S230). FIG. 21 shows a state in which the positions of shelf tiers of the display shelf shown in the Nth front-facing image information are specified (FIG. 20). The shelf tier position specification processing unit 25 stores the coordinates of the specified shelf tier positions in the shelf tier position coordinate storage unit 26 in association with the photographing date and time, the store identification information, the image information identification information for the photographed image information, and the image identification information for the front-facing image information.

Figure 22:
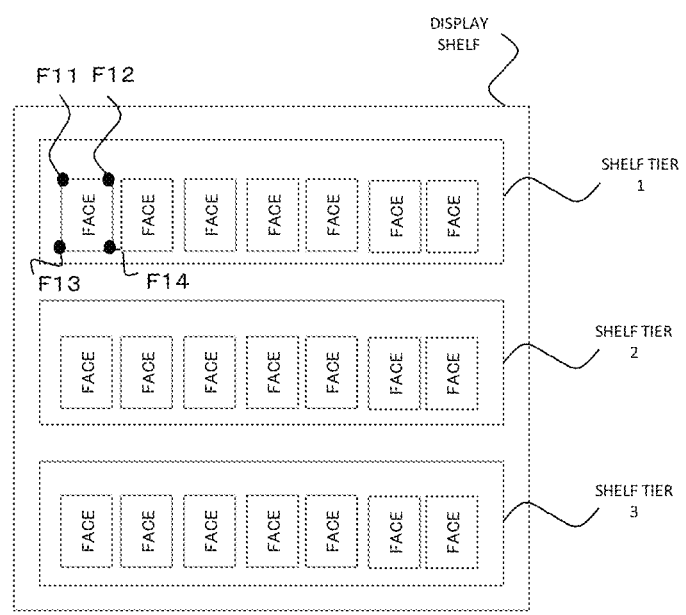
FIG. 22 is a diagram showing an example of front-facing image information in which face positions are specified.

Based on the shelf tier positions specified as described above, the face specification processing unit 27 extracts the coordinates F of the faces on the N−1th shelf tiers and the face identification information from the face coordinate storage unit 28, and specifies the extracted information as the face coordinates F and face identification information on the Nth shelf tiers (S240). The face specification processing unit 27 stores the specified coordinates of the faces and face identification information in association with the photographing date and time, the store identification information, the image information identification information for the photographed image information, and the image identification information for the front-facing image information. This makes it possible to specify the faces and their coordinates on the shelf tiers in the Nth front-facing image information as in the case of the N−1th front-facing image information. FIG. 22 schematically illustrates this.

Then, the shelf tier image matching processing unit 32 determines the similarity between the image information of a shelf tier in the Nth front-facing image information and the image information of a shelf tier in the N−1th front-facing image information (S250). Specifically, the shelf tier image matching processing unit 32 determines the similarity between the image information of the shelf tier 1 in the Nth front-facing image information (the image information of the region of the coordinates T11 to T14) and the image information of the shelf tier 1 in the N−1th front-facing image information (the image information of the region of the coordinates T11 to T14) by determining EMD between color histograms.

When the shelf tier image matching processing unit 32 determines that there exists similarity between the image information of the shelf tier 1 in the Nth front-facing image information and the image information of the shelf tier 1 in the N−1th front-facing image information (S260), the merchandise identification information specification processing unit 29 extracts the merchandise identification information of each face on the shelf tier 1 in the N−1th front-facing image information from the merchandise identification information specification processing unit 29, and specifies the extracted information as the merchandise identification information of the face at a corresponding position on the shelf tier 1 in the Nth front-facing image information (S270). Then, the merchandise identification information specification processing unit 29 stores the merchandise identification information of the specified faces in the merchandise identification information storage unit 31.

On the other hand, when the shelf tier image matching processing unit 32 does not determine that there exists similarity between the image information of the shelf tier in the Nth front-facing image information and the image information of the shelf tier in the N−1th front-facing image information (S260), the merchandise identification information storage unit 31 executes a specification process of merchandise identification information of each face on the shelf tier (S280).

Figure 23:
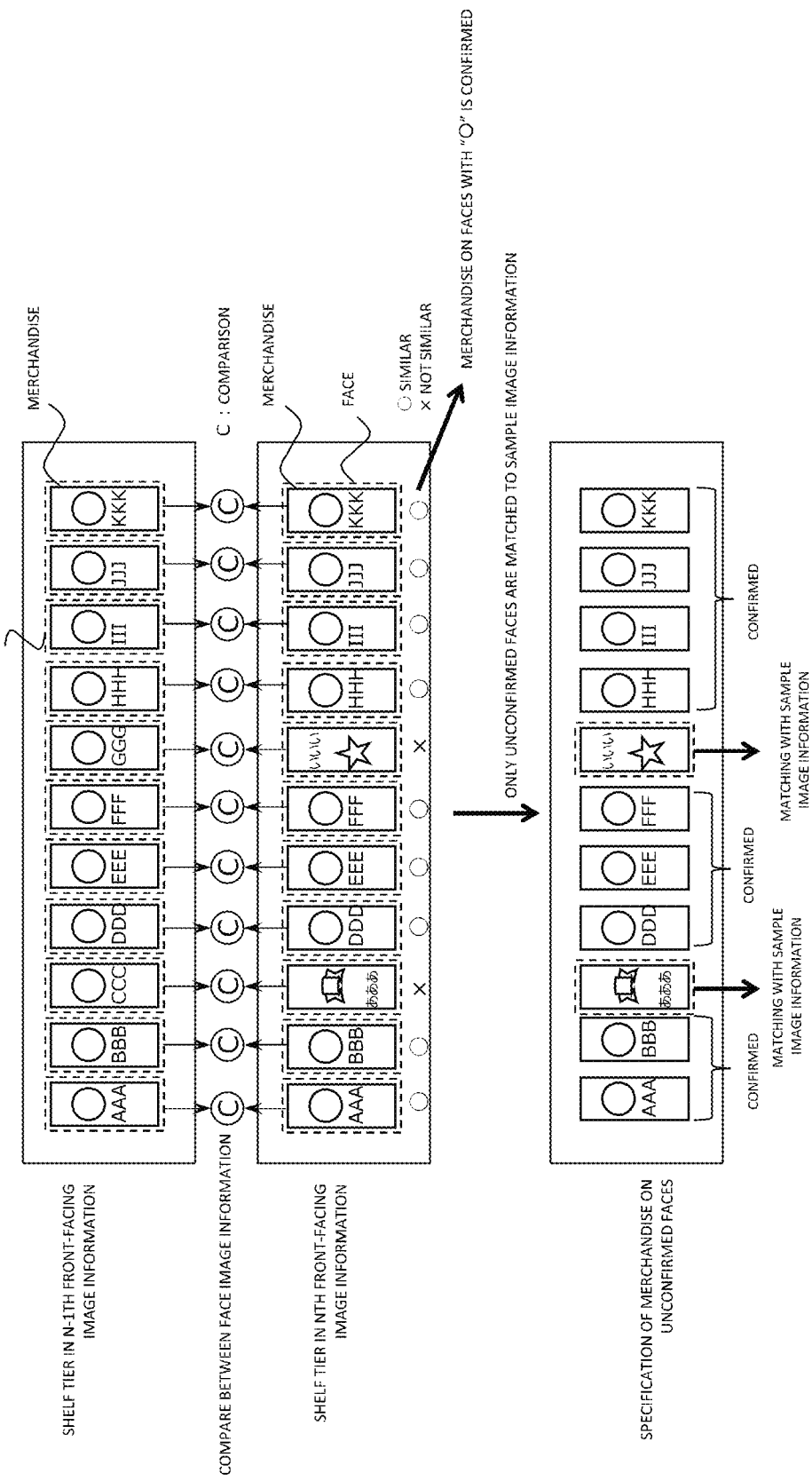
FIG. 23 is a diagram schematically showing a process of specifying merchandise identification information by comparing image information of faces in Nth front-facing image information with image information of corresponding faces in N−1th front-facing image information for determination of similarity.
Figure 24:
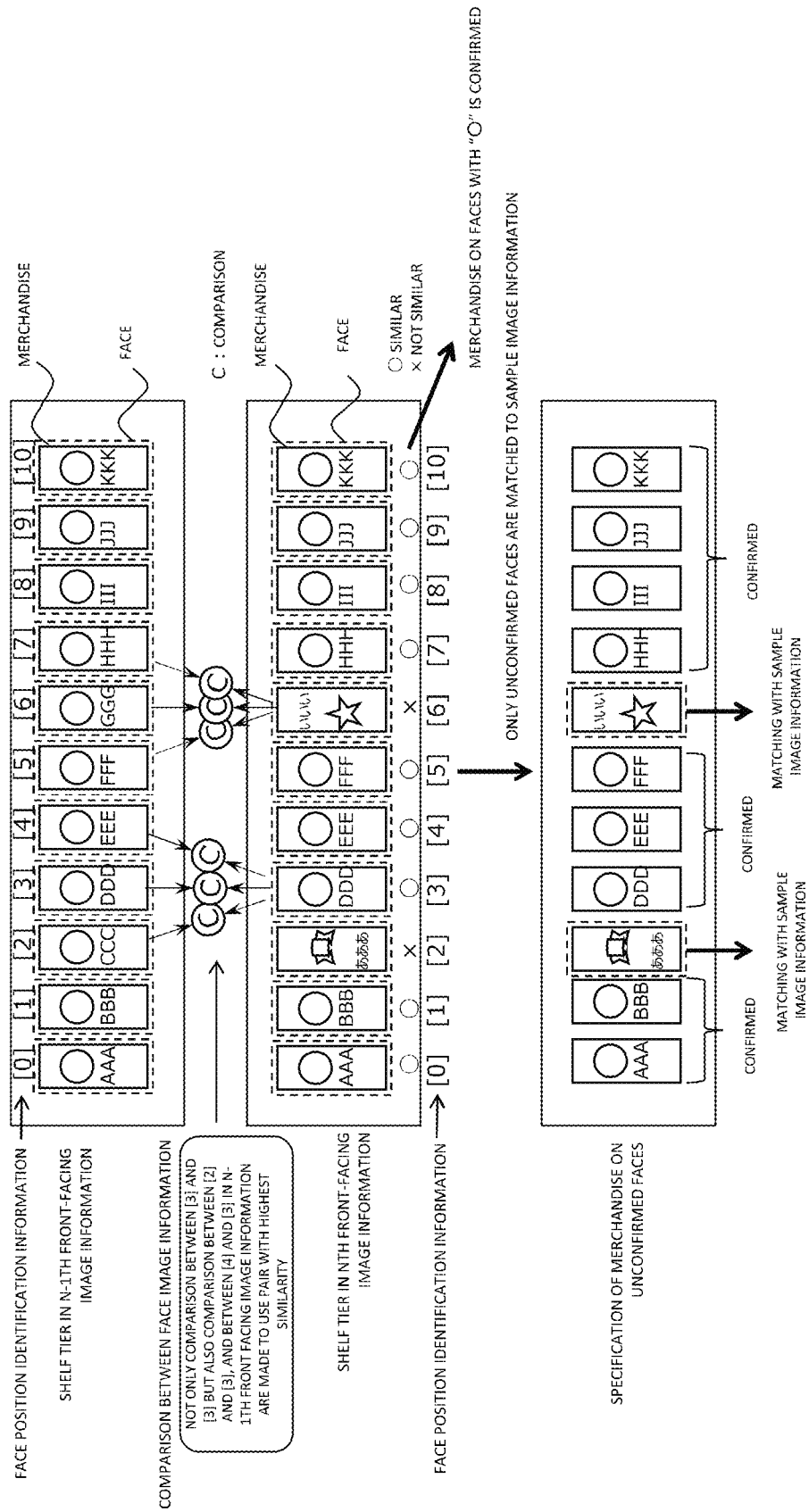
FIG. 24 is a diagram schematically showing a process of specifying merchandise identification information by comparing image information of faces in Nth front-facing image information with image information of corresponding faces and their surrounding faces in N−1th front-facing image information for determination of similarity.

Specifically, the merchandise identification information specification processing unit 29 compares the image information of the faces in the Nth front-facing image information with the image information of the corresponding faces and other faces in a predetermined range from the corresponding faces in the N−1th front-facing image information, and specifies the face in the N−1th front-facing image information with the highest degree of similarity. When the similarity is equal to or greater than a specific threshold, the merchandise identification information specification processing unit 29 specifies the merchandise identification information of the face in the Nth front-facing image information as the merchandise identification information corresponding to the face in the specified N−1th front-facing image information. FIGS. 23 and 24 schematically illustrate this process. FIG. 23 shows a process of specifying merchandise identification information by comparing image information of faces in Nth front-facing image information with image information of corresponding faces in N−1th front-facing image information for determination of similarity. FIG. 24 shows a process of specifying merchandise identification information by comparing image information of a face in the Nth front-facing image information with image information of the corresponding face and each right and left faces in the N−1th front-facing image information for determination of similarity. Note that, as shown in FIG.

24, the comparison target for similarity may include not only the corresponding face on the same shelf tier but also a predetermined number of faces on the right and left and faces on the upper and lower shelf tiers in the N−1th front-facing image information.

When the similarity of the face in the N−1th front-facing image information highest in the degree of similarity does not satisfy the specific threshold, the merchandise identification information specification processing unit 29 determines that the merchandise identification information of the face is unconfirmed. Then, the merchandise identification information specification processing unit 29 specifies the merchandise identification information by executing an image matching process of the image information of the face region and each sample image information stored in the sample image information storage unit 30 (S290).

The merchandise identification information specification processing unit 29 stores the specified merchandise identification information of each face in the merchandise identification information storage unit 31 in association with the photographing date and time, the store identification information, the image information identification information for the photographed image information, the image information identification information for the front-facing image information, and the face identification information (S300).

Note that all the merchandise identification information may not be specified. For the faces that cannot be specified, the merchandise identification information specification processing unit 29 accepts an input of merchandise identification information and stores the accepted merchandise identification information in the merchandise identification information storage unit 31 in association with the photographing date and time, the store identification information, the image information identification information for the photographed image information, the image information identification information for the front-facing image information, and the face identification information. Similarly, the merchandise identification information specification processing unit 29 may accept an input for a correction process of the specified merchandise identification information.

Performing the above process makes it possible to specify the merchandise identification information of the merchandise displayed on the shelf tiers of the display shelf seen in the photographed image information (FIG. 16). In addition, as for the photographed image information for the second and subsequent processes, the vertexes for the keystone correction process can be automatically specified to reduce the work by the person in charge. Further, comparing the image information of the faces with not the sample image information but the image information of the faces at the same positions as in the previous image or the image information of the faces within a predetermined range from the same positions makes it possible to reduce the image matching process and improve the accuracy of merchandise specification.

As for the process on the Nth photographed image information, it is preferable to use the processing result of the N−1th photographed image information or front-facing image information. However, the same process as that at the first time can be executed with arbitrary timing to correct a discrepancy in data caused by automatic processing to the original state.

INDUSTRIAL APPLICABILITY

Using the merchandise specification system 1 of the present invention makes it possible to specify merchandise on display shelves with higher accuracy than before and reduce the processing load.

REFERENCE SIGNS LIST

1 Merchandise specification system
2 Management terminal
3 Photographed image information input terminal
20 Photographed image information input acceptance processing unit
21 Photographed image information storage unit
22 Keystone correction processing unit
23 Vertex coordinate storage unit
24 Front-facing image information storage unit
25 Shelf tier position specification processing unit
26 Shelf tier position coordinate storage unit
27 Face specification processing unit
28 Face coordinate storage unit
29 Merchandise identification information specification processing unit
30 Sample image information storage unit
31 Merchandise identification information storage unit
32 Shelf tier image matching processing unit
70 Arithmetic device
71 Storage device
72 Display device
73 Input device
74 Communication device
220 Feature amount collection region in N−1th photographed image information
221 Feature amount collection region in Nth photographed image information
222 Shelf tier region
A Point group of local feature amounts in N−1th photographed image information
B Point group of local feature amounts in Nth photographed image information
C Shelf position in the N−1th photographed image information
D Shelf position in the Nth photographed image information
T Shelf tier position

The invention claimed is:

1. A merchandise specification system for specifying merchandise displayed on a display shelf, comprising:
a photographing device for acquiring a first photographed image information and a second photographed image information for the display shelf at different time points;
a keystone correction processing unit that performs a keystone correction process on the first photographed image information and the second photographed image information to generate a first front-facing image information and a second front-facing image information; and
a merchandise identification information specification processing unit that specifies a merchandise on a face in the first front-facing image information and the second front-facing image information to track a display status of the merchandise, wherein
the keystone correction processing unit
compares an image feature amount in a feature amount collection region that is set in the first photographed image information and includes vertexes used in the keystone correction process on the first photographed image information with an image feature amount in a feature amount collection region that is set in the second photographed image information and is larger than the feature amount collection region in the first photographed image information to specify a pair of image feature amounts with a high similarity, specifies an affine transformation function of projection from the first photographed image information onto the second photographed image information based on coordinates of the specified pair of the image feature amounts, projects the vertexes used in the keystone correction process on the first photographed image information onto the second photographed image information using the specified affine transformation function, and executes the keystone correction process on the second photographed image information using the projected vertexes to generate the second front-facing image information, and the merchandise identification information specification processing unit compares image information of a face in the second front-facing image information with image information of a face within a predetermined range of the first front-facing image information corresponding to the face to specify merchandise identification information of the merchandise on the face in the second front-facing image information.

2. The merchandise specification system according to claim 1, further comprising a sample image information storage unit that stores sample image information of merchandise, wherein when, as a result of the comparison between the image information of the face in the second front-facing image information and the image information of the face within the predetermined range in the first front-facing image information corresponding to the face, the similarity does not satisfy a predetermined condition, the merchandise identification information specification processing unit further compares the image information of the face in the second front-facing image information with the sample image information stored in the sample image information storage unit to specify the merchandise identification information of the merchandise on the face in the second front-facing image information.

3. The merchandise specification system according to claim 2, further comprising a face specification processing unit that specifies the face in the first front-facing image information and the second front-facing image information, wherein the face specification processing unit specifies a position of the face in the second front-facing image information based on a position of the face in the first front-facing image information.

4. The merchandise specification system according to claim 3, further comprising a shelf tier position specification processing unit that specifies a position of a shelf tier in the first front-facing image information and the second front-facing image information, wherein the shelf tier position specification processing unit specifies a position of the shelf tier in the second front-facing image information based on a position of the shelf tier in the first front-facing image information.

5. The merchandise specification system according to claim 4, wherein when the merchandise specification system is further configured to compare image information of a shelf tier in the second front-facing image information with image information of a shelf tier in the first front-facing image information, and similarity satisfies a predetermined condition, the merchandise identification information specification processing unit specifies merchandise identification information of a face on the shelf tier in the second front-facing image information as merchandise identification information of a face on the shelf tier in the first front-facing image information, without comparing the image information of the face in the second front-facing image information with the image information of the face in the predetermined range of the first front-facing image information corresponding to the face.

6. A merchandise specification system for specifying merchandise on a display shelf, comprising a photographing device for acquiring a first photographed image information and a second photographed image information for the display shelf at different time points;

a keystone correction processing unit that performs a keystone correction process on the first photographed image information and the second photographed image information to generate a first front-facing image information and a second front-facing image information, wherein the keystone correction processing unit compares an image feature amount in a feature amount collection region that is set in the first photographed image information and includes vertexes used in the keystone correction process on the first photographed image information with an image feature amount in a feature amount collection region that is set in the second photographed image information and is larger than the feature amount collection region in the first photographed image information to specify a pair of image feature amounts with a high similarity, specifies an affine transformation function of projection from the first photographed image information onto the second photographed image information based on coordinates of the specified pair of the image feature amounts, projects the vertexes used in the keystone correction process on the first photographed image information onto the second photographed image information using the specified affine transformation function, and executes the keystone correction process on the second photographed image information using the projected vertexes to generate the second front-facing image information.

7. An image processing system that specifies vertexes for performing a keystone correction process on photographed image information, comprising a photographing device for acquiring a first photographed image information and a second photographed image information for a target object at different time points;

a keystone correction processing unit that performs the keystone correction process on the first photographed image information and the second photographed image information to generate a first front-facing image information and a second front-facing image information, wherein the keystone correction processing unit compares an image feature amount in a feature amount collection region that is set in the first photographed image information and includes vertexes used in the keystone correction process on the first photographed image information with an image feature amount in a feature amount collection region that is set in the second photographed image information and is larger than the feature amount collection region in the first photographed image information to specify a pair of image feature amounts with a high similarity, specifies an affine transformation function of projection from the first photographed image information onto the second photographed image information based on coordinates of the specified pair of the image feature amounts, projects the vertexes used in the keystone correction process on the first photographed image information onto the second photographed image information using the specified affine transformation function, and executes the keystone correction process on the second photographed image information using the projected vertexes to generate the second front-facing image information.

8. A merchandise specification program for causing a computer to serve as a photographing device for acquiring a first photographed image information and a second photographed image information for a display shelf at different time points;

a keystone correction processing unit that performs a keystone correction process on the first photographed image information and the second photographed image information to generate a first front-facing image information and a second front-facing image information, and a merchandise identification information specification processing unit that specifies merchandise on a face in the first front-facing image information and the second front-facing image information to track a display status of the merchandise, wherein the keystone correction processing unit compares an image feature amount in a feature amount collection region that is set in the first photographed image information and includes vertexes used in the keystone correction process on the first photographed image information with an image feature amount in a feature amount collection region that is set in the second photographed image information and is larger than the feature amount collection region in the first photographed image information to specify a pair of image feature amounts with a high similarity, specifies an affine transformation function of projection from the first photographed image information onto the second photographed image information based on coordinates of the specified pair of the image feature amounts, projects the vertexes used in the keystone correction process on the first photographed image information onto the second photographed image information using the specified affine transformation function, and executes the keystone correction process on the second photographed image information using the projected vertexes to generate the second front-facing image information, and the merchandise identification information specification processing unit compares the image information of a face in the second front-facing image information with the image information of a face within a predetermined range of the first front-facing image information corresponding to the face to specify merchandise identification information of the merchandise on the face in the second front-facing image information.

9. A merchandise specification program for causing a computer to serve as a photographing device for acquiring a first photographed image information and a second photographed image information for a display shelf at different time points;

a keystone correction processing unit that performs a keystone correction process on the first photographed image information and the second photographed image information to generate a first front-facing image information and a second front-facing image information, wherein the keystone correction processing unit compares an image feature amount in a feature amount collection region that is set in the first photographed image information and includes vertexes used in the keystone correction process on the first photographed image information with an image feature amount in a feature amount collection region that is set in the second photographed image information and is larger than the feature amount collection region in the first photographed image information to specify a pair of image feature amounts with a high similarity, specifies an affine transformation function of projection from the first photographed image information onto the second photographed image information based on coordinates of the specified pair of the image feature amounts, projects the vertexes used in the keystone correction process on the first photographed image information onto the second photographed image information using the specified affine transformation function, and executes the keystone correction process on the second photographed image information using the projected vertexes to generate the second front-facing image information.

10. An image processing program for causing a computer to serve as a photographing device for acquiring a first photographed image information and a second photographed image information for a target object at different time points;

a keystone correction processing unit that performs a keystone correction process on the first photographed image information and the second photographed image information to generate a first front-facing image information and a second front-facing image information, wherein the keystone correction processing unit compares an image feature amount in a feature amount collection region that is set in the first photographed image information and includes vertexes used in the keystone correction process on the first photographed image information with an image feature amount in a feature amount collection region that is set in the second photographed image information and is larger than the feature amount collection region in the first photographed image information to specify a pair of image feature amounts with a high similarity, specifies an affine transformation function of projection from the first photographed image information onto the second photographed image information based on coordinates of the specified pair of the image feature amounts, projects the vertexes used in the keystone correction process on the first photographed image information onto the second photographed image information using the specified affine transformation function, and executes the keystone correction process on the second photographed image information using the projected vertexes to generate the second front-facing image information.

* * * * *